United States Patent
Hung et al.

(10) Patent No.: US 10,886,834 B1
(45) Date of Patent: Jan. 5, 2021

(54) POWER CONVERTER

(71) Applicant: Dialog Semiconductor (UK) Limited, London (GB)

(72) Inventors: Der Ju Hung, Taoyuan (TW); Yu Ta Lin, New Taipei (TW); Yuan Wen Hsiao, Hsinchu (TW); Chi-Chia Huang, Hsinchu (TW); Chia Wen Tsai, Taichung (TW)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 16/119,429

(22) Filed: Aug. 31, 2018

(51) Int. Cl.
*H02M 1/14* (2006.01)
*H02M 3/07* (2006.01)

(52) U.S. Cl.
CPC ............. *H02M 1/143* (2013.01); *H02M 3/07* (2013.01)

(58) Field of Classification Search
CPC .......... H02M 1/14; H02M 1/143; H02M 1/15; H02M 3/02; H02M 3/04; H02M 3/06; H02M 3/07; H02M 3/10; H02M 3/145; H02M 3/155; H02M 3/156; H02M 3/1563; H02M 3/1566; H02M 3/157; H02M 3/158
See application file for complete search history.

(56) References Cited

U.S. PATENT DOCUMENTS

| | | | | |
|---|---|---|---|---|
| 8,854,019 | B1 * | 10/2014 | Levesque ................ | H02M 3/07 323/266 |
| 2014/0333281 | A1 * | 11/2014 | Li ......................... | G06F 1/3203 323/318 |
| 2015/0280556 | A1 * | 10/2015 | Bari ...................... | H02M 3/156 323/282 |

OTHER PUBLICATIONS

"Adaptive-On-Time Control Technique for Output Ripple Reduction and Light-Load Efficiency Enhancement in Low-Power Switched-Capacitor DC-DC Regulators," by Zhe Hua et al., 2015 IEEE Applied Power Electronics Conference and Exposition (APEC), Mar. 15-19, 2015, pp. 1930-1933.
"Low-Ripple and Dual-Phase Charge Pump Circuit Regulated by Switched-Capacitor-Based Bandgap Reference," by Ming-Hsin Huang et al., IEEE Transactions on Power Electronics, vol. 24, No. 5, May 2009, pp. 1161-1172.
1998 Maxim Integrated Products, "3.3 V-Input to Regulated 5V-Output Charge Pumps," 19-0177; Rev 1:8/98, http://www.maxim-ic.com, pp. 1-12.
Texas Instruments, "TPS60150 5-V, 140-mA Charge-Pump," Dec. 2008, Data Sheet, 26 pgs.
"High Voltage Charge Pump Using Standard CMOS Technology," by Jean-Francois Richard et al., The 2nd Annual IEEE Northeast Workshop on Circuits and Systems, 2004. NEWCAS 2004, Jun. 23, 2004, DOI: 10.1109/NEWCAS.2004.1359095, 4 pgs.

* cited by examiner

Primary Examiner — Diana J. Cheng
(74) Attorney, Agent, or Firm — Saile Ackerman LLC; Stephen B. Ackerman

(57) ABSTRACT

A power converter and a method for receiving an input voltage and providing an output voltage is presented. The power converter has a switching circuit to generate the output voltage. The switching circuit has a first switch, a switch control circuit arranged to selectively operate the first switch in a first state or a second state. There is a ripple reduction circuit to set a first state duration based on a property of a load current. The load current is a current that the power converter provides to a load that is coupled to the output voltage.

21 Claims, 23 Drawing Sheets

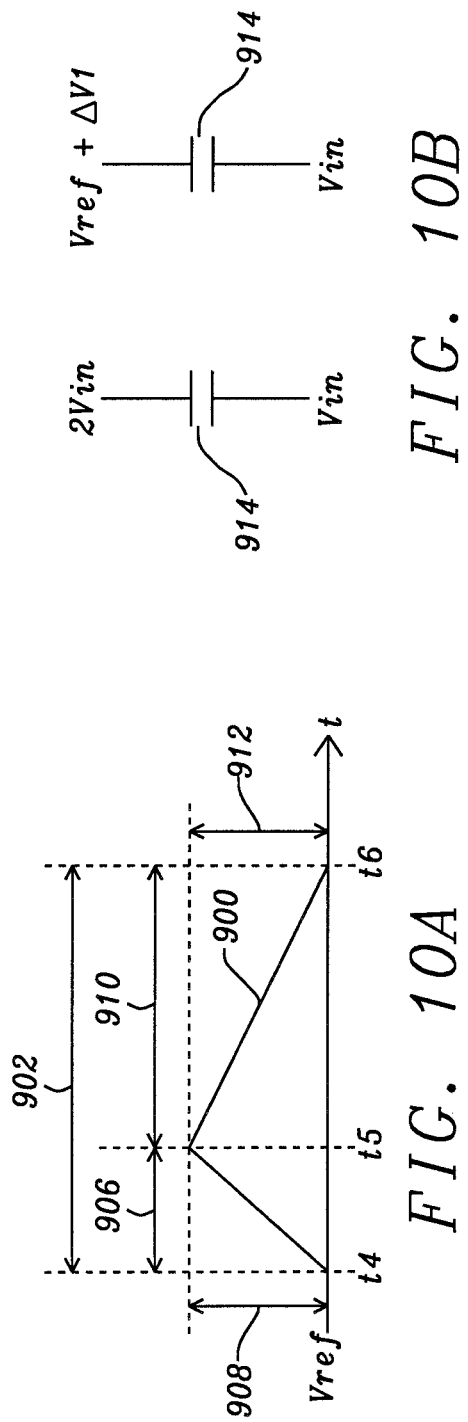

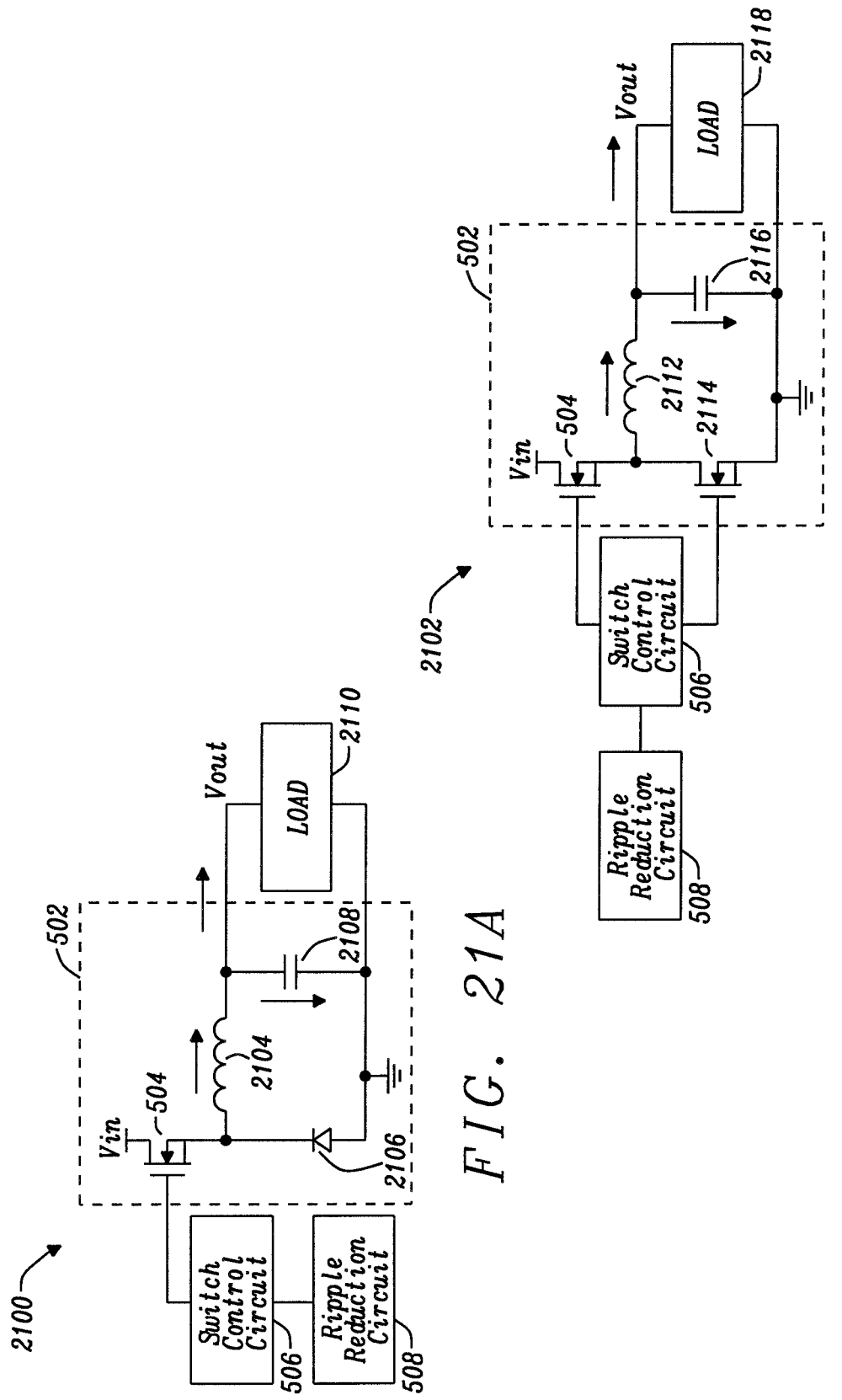

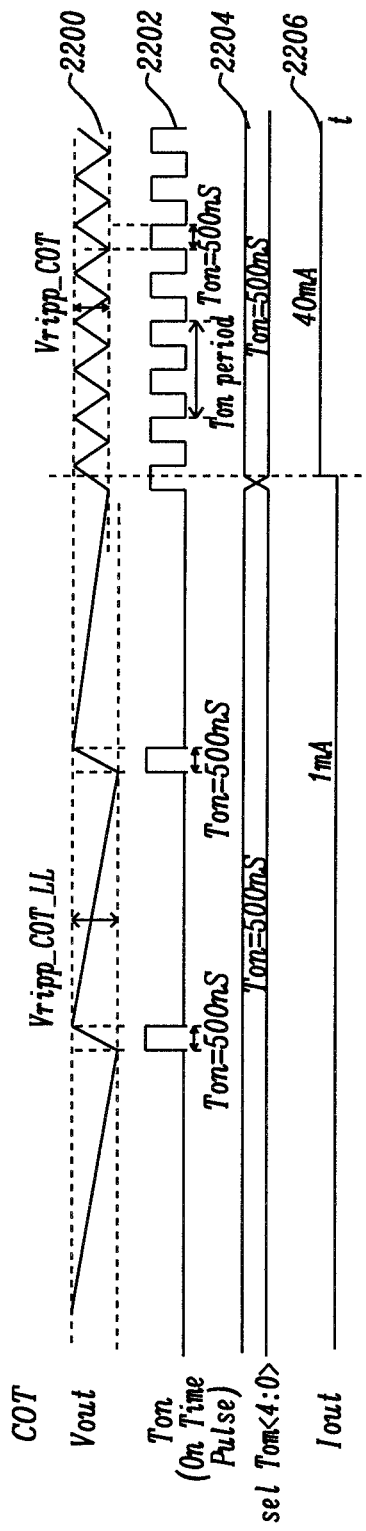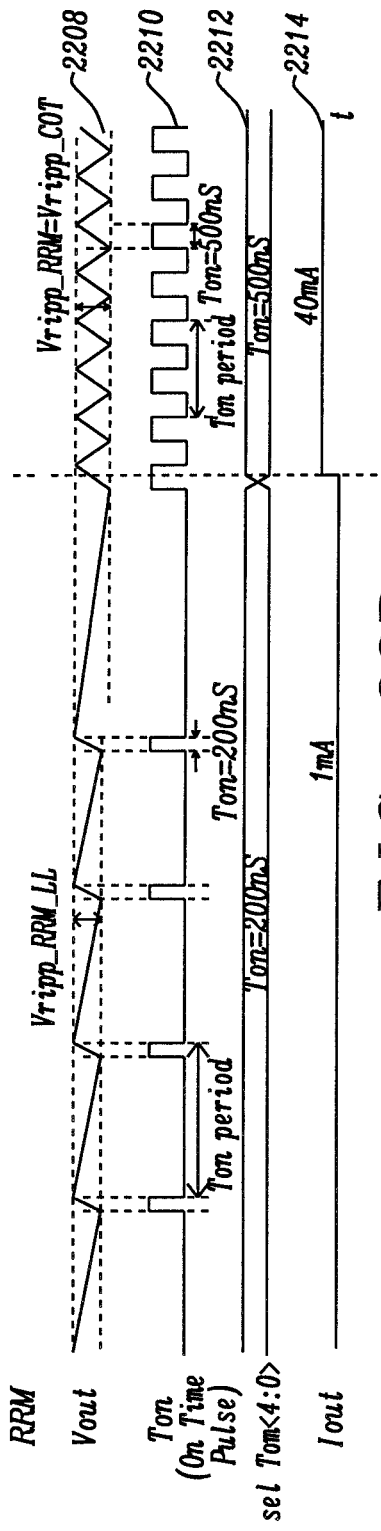
FIG. 22A
FIG. 22B

POWER CONVERTER

The present disclosure relates to a power converter for receiving an input voltage and providing an output voltage. In particular, the present disclosure relates to a power converter comprising a ripple reduction circuit for reducing ripple under different load currents.

BACKGROUND

A charge pump is a type of power converter that receives an input voltage and provides an output voltage. A charge pump may also be referred to as being a type of voltage regulator.

A charge pump may be used for display applications, where it can provide a suitable output voltage to illuminate the light emitting elements of the display. A charge pump may be used in displays such as thin-film-transistor (TFT) displays or for liquid-crystal displays (LCD).

However, a charge pump may be susceptible to periodic variations on its output voltage, which is often referred to as "ripple". In display applications, a sufficiently high output voltage ripple may lead to a flickering display which can deteriorate the user experience.

Other power converters, such as buck converters are also susceptible to output voltage ripple.

SUMMARY

It is desirable to provide a power converter with reduced output voltage ripple when compared with the prior art.

According to a first aspect of the disclosure there is provided a power converter for receiving an input voltage and providing an output voltage, the power converter comprising a switching circuit configured to generate the output voltage, the switching circuit comprising a first switch, a switch control circuit arranged to selectively operate the first switch in a first state or a second state, and a ripple reduction circuit configured to set a first state duration based on a property of a load current, wherein the load current is a current that the power converter provides to a load that is coupled to the output voltage.

Optionally, the first state is an on state and the second state is an off state.

Optionally, the ripple reduction circuit is configured to detect a switching period of the first switch, and the ripple reduction circuit is configured to set the first state duration based on the property of the load current, the property of the load current being determined from the switching period.

Optionally, the switch control circuit switches the first switch from the second state to the first state when a condition is met, the condition relating to a comparison between the output voltage and a reference voltage.

Optionally, the condition comprises the output voltage being approximately equal to the reference voltage.

Optionally, the power converter comprises a voltage comparison circuit configured to receive the output voltage and a reference voltage and to provide an output signal to the switch control circuit, wherein the output signal is dependent on the comparison between the output voltage and the reference voltage.

Optionally, the voltage comparison circuit comprises a comparator.

Optionally, the first state duration is set to a first value when the switching period is less than a first threshold value, and the first state duration is set to a second value when the switching period is greater than or equal to the first threshold value.

Optionally, the switching circuit comprises an output capacitor configured to provide the output voltage, and the output capacitor is charged when the first switch is in the first state.

Optionally, the switching circuit comprises a flying capacitor, and the output capacitor is charged by the flying capacitor when the first switch is in the first state.

Optionally, the switching circuit comprises a first switching pair comprising the first switch and a second switch, and a second switching pair comprising a third switch and a fourth switch, wherein the switch control circuit is arranged to selectively operate each of the second switch, the third switch and the fourth switch in a first state or a second state, the first switching pair is arranged to couple the flying capacitor to the output capacitor when the first switch and the second switch are in the first state and the third switch and the fourth switch are in the second state, and the second switching pair is configured to couple the flying capacitor to the input voltage when the third switch and the fourth switch are in the first state and the first switch and the second switch are in the second state.

Optionally, the power converter is a charge pump.

Optionally, the ripple reduction circuit comprises a counter circuit configured to detect the switching period of the first switch by detecting the state of the first switch, and determining the switching period from the state of the first switch.

Optionally, determining the switching period from the state of the first switch comprises determining a time period between a transition of the first switch from the second state to the first state and a next transition of the first switch from the second state to the first state.

Optionally, the ripple reduction circuit comprises a look up table circuit configured to receive a switching period signal from the counter circuit, and to set the first state duration based on the property of the load current, the property of the load current being determined from the switching period, wherein the switching period signal comprises information relating the switching period.

According to a second aspect of the disclosure there is provided a ripple reduction circuit for a power converter for receiving an input voltage and providing an output voltage, the power converter comprising a switching circuit configured to generate the output voltage, the switching circuit comprising a first switch, and a switch control circuit arranged to selectively operate the first switch in a first state or a second state, wherein the ripple reduction circuit is configured to set a first state duration based on a property of a load current, and the load current is a current that the power converter provides to a load that is coupled to the output voltage.

According to a third aspect of the disclosure there is provided a method of power conversion using a power converter for receiving an input voltage and providing an output voltage, the method comprising generating the output voltage using a switching circuit, the switching circuit comprising a first switch, selectively operating the first switch in a first state or a second state using a switch control circuit, and setting a first state duration based on a property of a load current using a ripple reduction circuit, wherein the load current is a current that the power converter provides to a load that is coupled to the output voltage.

According to a fourth aspect of the disclosure there is provided a method of ripple reduction using a ripple reduction circuit for a power converter for receiving an input voltage and providing an output voltage, the power converter comprising a switching circuit configured to generate the output voltage, the switching circuit comprising a first switch, and a switch control circuit arranged to selectively operate the first switch in a first state or a second state, the method comprising setting a first state duration based on a property of a load current using the ripple reduction circuit, wherein the load current is a current that the power converter provides to a load that is coupled to the output voltage.

It will be appreciated that the methods of the third and fourth aspects may include providing and/or using the features set out in the first and second aspects and can incorporate other features as described herein.

BRIEF DESCRIPTION OF THE DRAWINGS

The disclosure is described in further detail below by way of example and with reference to the accompanying drawings, in which:

FIG. 10A is a graph of an output voltage of a charge pump varying over time, FIG. 10B shows a schematic of a flying capacitor during a charge pump on state, and a schematic of the flying capacitor during a charge pump off state;

FIG. 21A is a schematic of an asynchronous buck converter in accordance with an embodiment of this disclosure and FIG. 21B is a schematic of a synchronous buck converter in accordance with an embodiment of this disclosure; and FIG. 22A is a graph of an output voltage, a switching state, an on state duration and a load current as they vary with time, for a constant on time (COT) buck converter, FIG. 22B is a graph of an output voltage, a switching state, an on state duration and a load current for either one of the buck converters of FIG. 21A and FIG. 21B.

DESCRIPTION

A regulated charge pump may be, for example, a pulse skipping mode (PSM) charge pump, a linear mode (LIN) charge pump or a constant on time (COT) charge pump.

Figure 1:
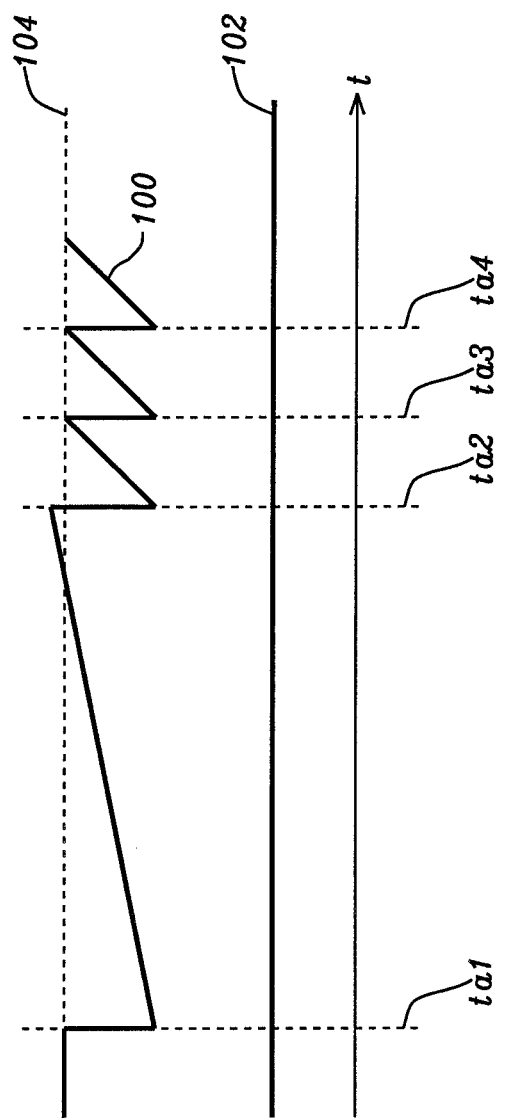
FIG. 1 is a graph showing the output voltage and the on-time pulse of a pulse skipping mode (PSM) charge pump, as they vary with time.

A PSM charge pump, which comprises a comparator and a digital control circuit, may exhibit high output voltage ripple when it is in the steady state. FIG. 1 shows a graph of an output voltage 100 of a PSM charge pump, as it varies with time t; and shows an on-time pulse 102. Also shown is a target voltage 104, which is the desired output voltage of the PSM charge pump. The on-time pulse 102 "pulses" at times ta1, ta2, ta3, ta4. The "pulses" correspond to a clock edge that triggers a switching operation when the output voltage 100 is greater than or equal to the target voltage. The switching operation is used to couple an energy storage element of the PSM charge pump to an output of the PSM charge pump. As the clock edge may not trigger switching until after the output voltage 100 exceeds the target voltage 104 (as shown at time ta2), there may be a high output voltage ripple.

Figure 2:
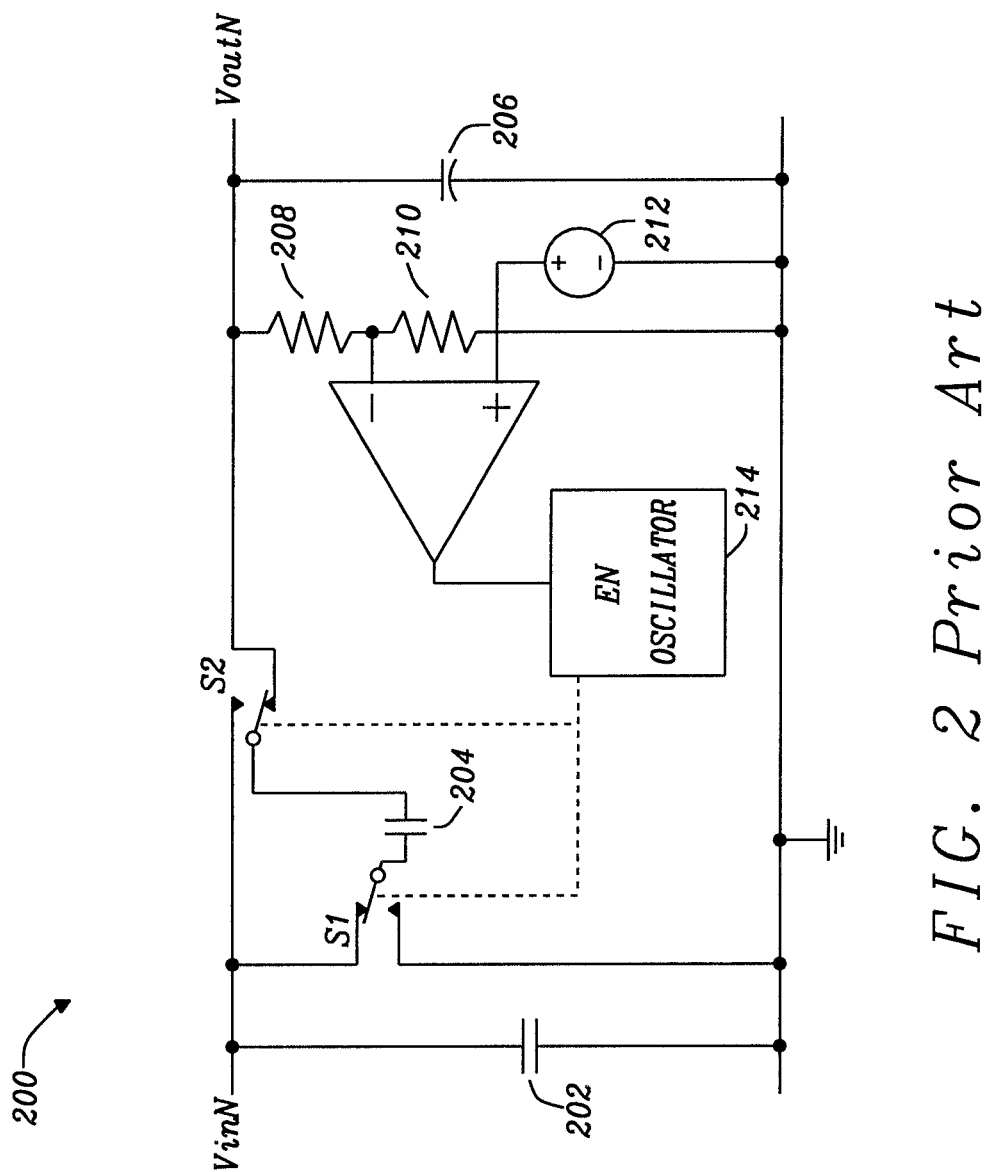
FIG. 2 is a schematic of a PSM charge pump.

Output voltage ripple may be reduced in a PSM charge pump by using a sufficiently large output capacitor, or by operating in a dual phase mode with two, rather than one, flying capacitors. However, these methods require a greater bill of materials (BOM) cost. Additionally, for load currents exceeding approximately 100 mA, a sufficiently large output capacitor, or an additional flying capacitor is difficult to implement due to limited printed circuit board (PCB) area. FIG. 2 shows a PSM charge pump 200 comprising switches S1, S2; capacitors 202, 204, 206; resistors 208, 210; a reference voltage source 212; an oscillator 214; and configured to receive an input voltage VinN and to provide an output voltage VoutN (Maxim, 3.3V-Input to Regulated 5V-Output, Charge Pumps).

Figure 3:
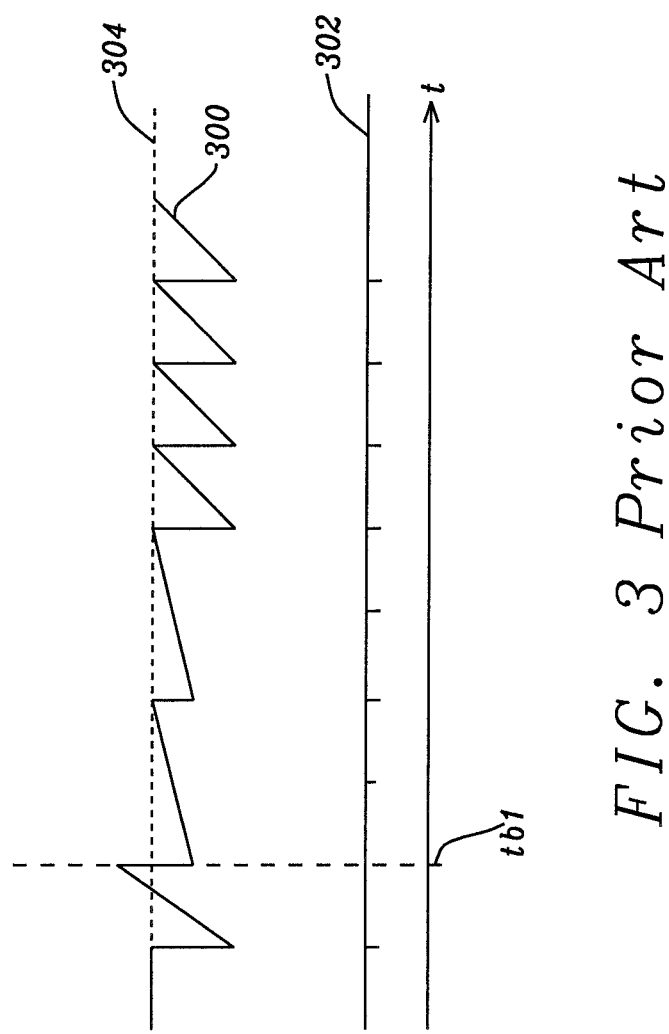
FIG. 3 is a graph showing the output voltage and the on-time pulse of a linear mode (LIN) charge pump, as they vary with time.

FIG. 3 shows a graph of an output voltage 300 of a LIN charge pump, as it varies with time t; and shows an on-time pulse 302. Also shown is a target voltage 304, which is the desired output voltage of the LIN charge pump. As for the PSM charge pump, the clock edge may not trigger switching until after the output voltage 300 exceeds the target voltage 304 (as shown at time tb1), such that there may be a high output voltage ripple. As a LIN charge pump comprises a feedback loop, the LIN charge pump may exhibit smaller ripple at small load currents during the steady state, when compared to the PSM charge pump. However, the LIN charge pump requires a complex feedback loop, resulting in a more complex charge pump design, when compared to the PSM charge pump.

Figure 4:
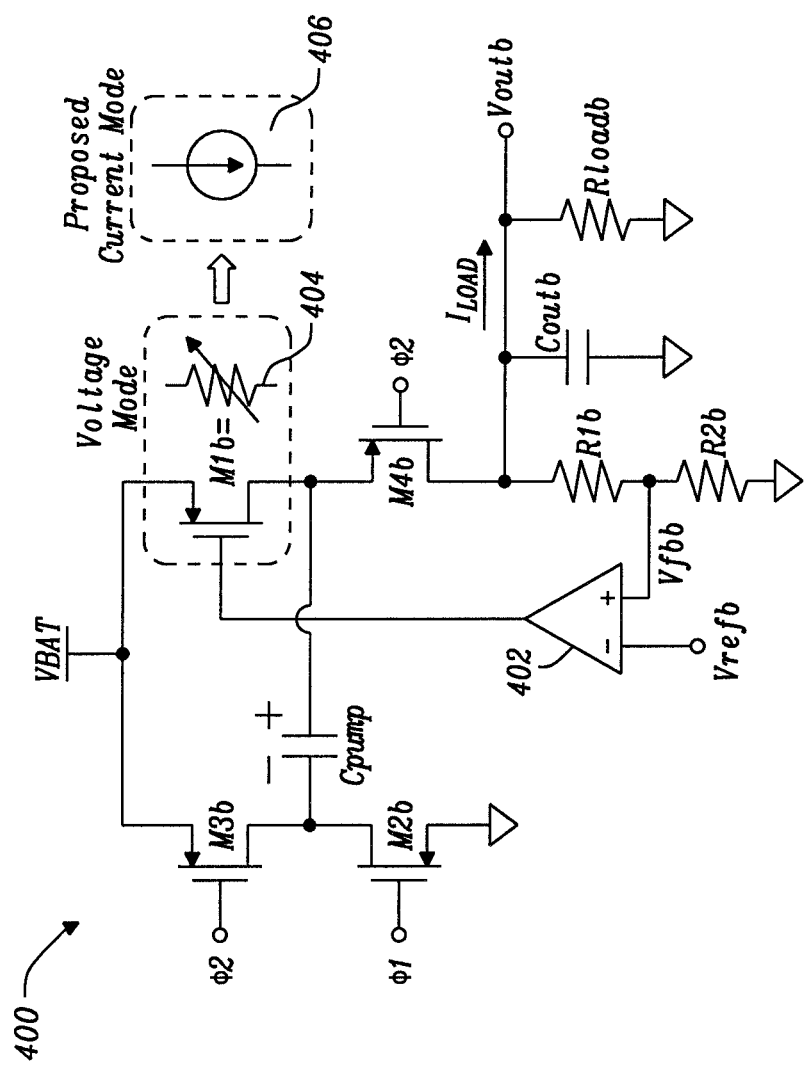
FIG. 4 is a schematic of a LIN charge pump.

FIG. 4 shows a schematic of a LIN charge pump 400 comprising an error amplifier 402 to control a variable resistor 404 or voltage controlled current source 406 (Ming-Hsin Huang, et. al., Low-Ripple and Dual-Phase Charge Pump Circuit Regulated by Switched-Capacitor-Based Bandgap Reference, IEEE Transactions on Power Electronics, Vol. 24, No. 5, May 2009). The LIN charge pump further comprises transistors M2b, M3b, M4b; capacitors Coutb and resistors Rb, R2b, Rloadb.

When a feedback voltage Vfbb is much less than a reference voltage Vrefb, meaning an output voltage Voutb is much less than a target value, then an on resistance Ronb of transistor M1b would be sufficiently small to enable a battery voltage VBAT to charge a capacitor Cpump strongly in a first phase Φ1 and the output voltage Voutb would be charged strongly in a second phase Φ2 by the capacitor Cpump.

As the feedback voltage Vfbb gets closer to the reference voltage Vrefb, the on resistance Ronb of transistor M1b would increase, such that the battery voltage VBAT would charge the capacitor Cpump weakly in the first phase Φ1 and Cpump would charge Voutb weakly in the second phase Φ2.

If the feedback voltage Vfbb exceeds the reference voltage Vrefb, then the output voltage Voutb would be greater than the target value, transistor M1b would effectively be in an off state and the battery voltage VBAT would stop charge the capacitor Cpump during the first phase Φ1. Therefore, there would be no charging of the output voltage Voutb in the second phase Φ2. This method can reduce the output voltage Voutb ripple for small load currents, however as discussed previously, a complex feedback loop is required.

A COT mode charge pump differs from PSM mode and LIN mode charge pumps, in that the COT mode charge pump will typically not use a synchronised clock. Typically, a COT mode charge pump comprises a valley or peak detection circuit, configured to detect when a valley or peak of an output voltage reaches a target value. A "valley" refers to a minimum voltage value, and a "peak" refers to a maximum voltage value. The COT mode charge pump comprises a flying capacitor which starts to charge an output capacitor when the valley or peak of the output voltage reaches the target value. The ripple of a COT mode charge pump is similar to that of a PSM mode charge pump, and the ripple of both PSM and COT mode charge pumps vary with load current.

The load current is the current drawn from a power source by a load. The power source may, for example, be a power converter, such as a charge pump. The load typically refers to an electrical component or portion of a circuit that consumes power.

FIG. 5A shows a schematic of a power converter 500, for example a charge pump, for receiving an input voltage Vin and providing an output voltage Vout, in accordance with a first embodiment of this disclosure. The power converter 500 comprises a switching circuit 502 that is configured to generate the output voltage Vout. The switching circuit 502 comprises a switch 504. The power converter 500 further comprises a switch control circuit 506 that is arranged to selectively operate the switch 504 in a first state or a second state. The first state may, for example, be an on state, where the switch 504 is closed and permits current flow, and the second state may, for example, be an off state, where the switch 504 is open and prevents current flow. It will be appreciated that in further embodiments the first state may be an off state, and the second state may be on state. The power converter 500 further comprises a ripple reduction circuit 508 that is configured to set a first state duration based on a property of a load current. The first state duration is the duration of time over which the switch 504 is in the first state before switching back to the second state. A second state duration is the duration of time over which the switch 504 is in the second state before switching back to the first state.

A load 509 may be coupled to the output voltage Vout. The load current is a current that the power converter 500 provides to the load 509.

The switch control circuit 506 "selectively operates" the switch 504 in a first state or a second state by providing a control signal that switches the switch 506 from one state to another state. For example, from the first state to the second state or from the second state to the first state.

In operation, the switch control circuit switches the switch 504 from the first state to the second state and from the second state to the first state. This switching operation results in the generation of the output voltage Vout from the input voltage Vin. Based on a property of the load current, the ripple reduction circuit 508 adjusts the duration of time over which the switch remains in the first state before switching back to the second state.

"A property" of a load current may be any characteristic that provides information relating to the load current. This may, for example, be the size/value of the load current or may alternatively be an indication that the load current has increased or decreased, with no determination of its value.

The ripple reduction circuit 508 may directly sense the load current and adjust the first state duration accordingly, where the property of the load current is its measured value.

Alternatively, the ripple reduction circuit 508 may sense load current indirectly. For example, the ripple reduction circuit 508 may be configured to detect a switching period of the switch 504. The first state duration is then set based on the property of the load current, where the property of the load current is determined from the switching period.

As the switching period is dependent on the load current, the value of the load current may be determined by measurement of the switching period. The value of the load current determined by measurement of the switching period may correspond to a precise value, or it may correspond to a range of values.

Alternatively, the switching period may provide an indication of a variation in the load current, for example that it has increased or decreased, without having any specific information on the value of the load current.

The switch control circuit 506 may switch the switch 504 from the second state to the first state when a condition is met. For example, the condition may relate to a comparison between the output voltage Vout and a reference voltage. For example, the condition may comprise the output voltage Vout being approximately equal to the reference voltage, such that the switch control circuit 506 switches the switch 504 from the second state to the first state when the output voltage Vout is approximately equal to the reference voltage.

Figure 5:
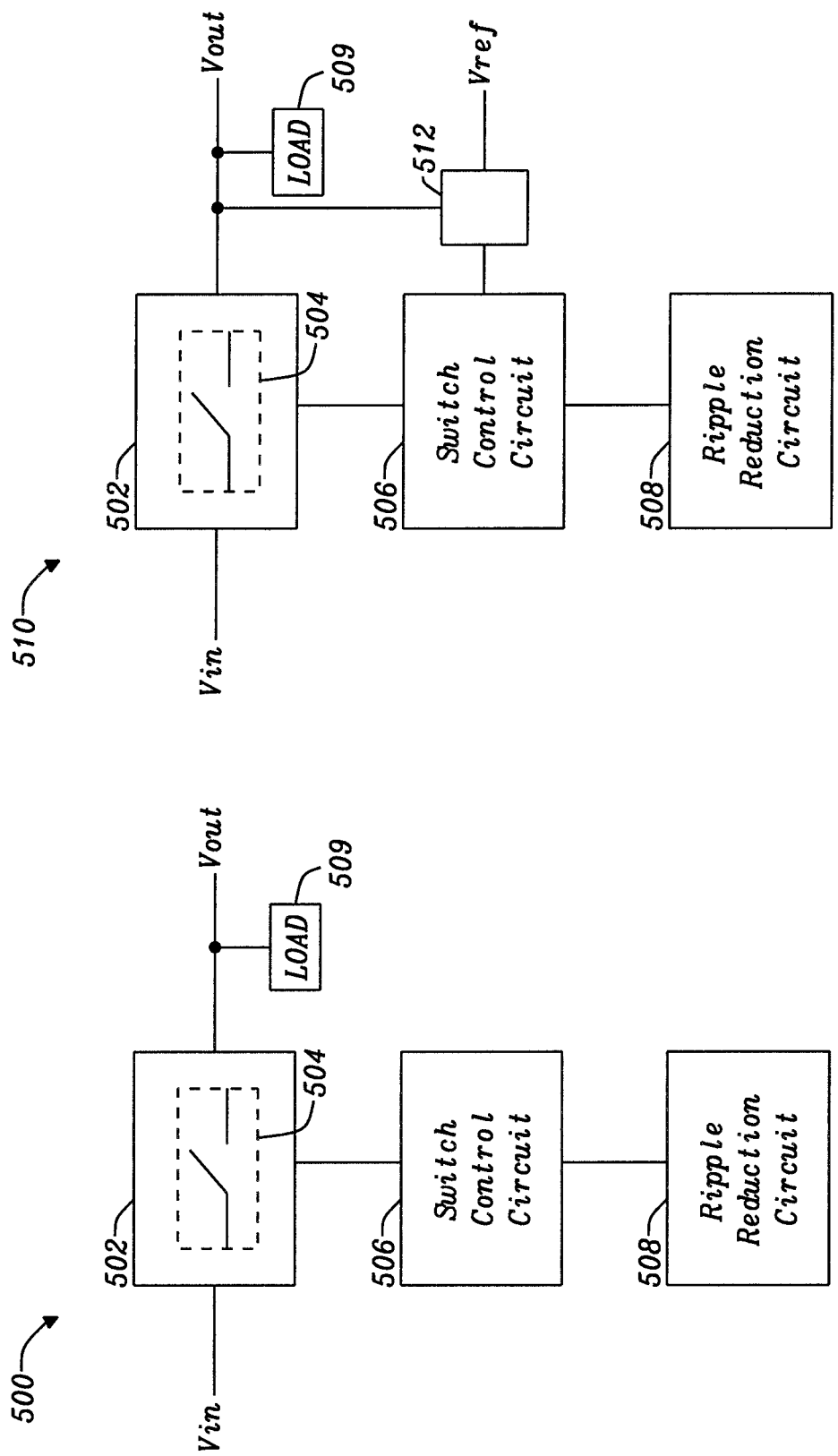
FIG. 5A is a schematic of a power converter in accordance with a first embodiment of this disclosure.
FIG. 5B is a schematic of a power converter in accordance with a second embodiment of this disclosure.

FIG. 5 shows a schematic of a power converter 510, for example a charge pump, in accordance with a second embodiment of the present disclosure. Common features between the power converter 500 and the power converter 510 are represented by common reference numerals. The power converter 510 corresponds to the power converter 500 but further comprises a voltage comparison circuit 512. The voltage comparison circuit 512 is configured to receive the output voltage Vout and a reference voltage Vref, and to provide an output signal to the switch control circuit 506. The output signal is dependent on the comparison between the output voltage Vout and Vref; and the switch control circuit 506 switches the switch 504 from the second state to the first state based on the output signal received by the switch control circuit 506. As discussed previously for the power converter 500, the switch control circuit 506 may switch the switch 504 from the second state to the first state when the output voltage Vout is approximately equal to the reference voltage Vref.

A known ripple reduction method (Zhe Hua and Hoi Lee, Adaptive-On-Time Control Technique for Output Ripple Reduction and Light-Load Efficiency Enhancement in Low-Power Switched-Capacitor DC-DC Regulators, 2015 IEEE Applied Power Electronics Conference and Exposition (APEC)) does not disclose a ripple reduction circuit configured to set a first state duration based on a property of a load current.

Figure 6:
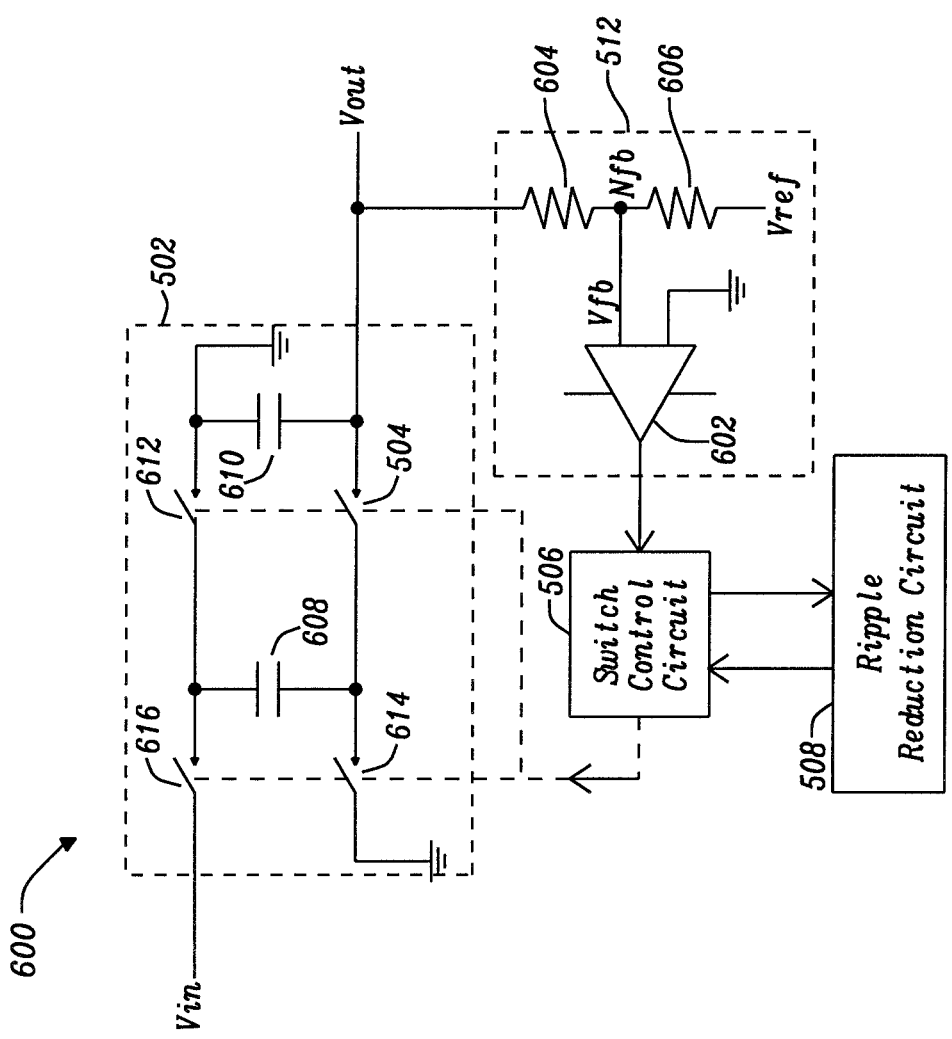
FIG. 6 is a schematic of a charge pump in accordance with a third embodiment of this disclosure.

FIG. 6 shows a schematic diagram of a charge pump 600 in accordance with a third embodiment of the present disclosure. Common features between the charge pump 600 and the power converter 500, 510 are represented by common reference numerals and variables.

The charge pump 600 may be referred to as a negative charge pump as it provides an output voltage that may be approximately equal to a negative input voltage. However, it will be appreciated that the present disclosure may be applied to other suitable charge pumps, such as positive charge pumps.

The charge pump 600 is a regulated charge pump. However, it will be appreciated that further embodiments may relate to unregulated charge pumps.

In this specific embodiment, the charge pump 600 shares features with a typical COT charge pump design, however the inclusion of the ripple reduction circuit 508 to adjust the first state duration in effect provides an "adaptive" on time, that is adaptive to changes in the load current.

The voltage comparison circuit 512 comprises a comparator 602, a resistor 604 and a resistor 606. A first input terminal of the comparator 602 receives a feedback voltage Vfb and a second input terminal of the comparator 602 is coupled to ground. The resistor 604 has a first terminal coupled to the output voltage Vout and a second terminal coupled to a feedback node Nfb. The resistor 606 has a first terminal coupled to the feedback node Nfb and a second terminal coupled to the reference voltage Vref. Therefore, the feedback voltage Vfb is dependent on the output voltage Vout and the reference voltage Vref. The comparator 602 provides the output signal to the switch control circuit 506.

For the following description the first state will be referred to as the on state, where a switch is on; and the second state will be referred to as the off state, where the switch is off. It will be appreciated that these terms are used for convenience and to aid in the clarity of description of the present embodiment; the use of these terms is not intended to be limiting, for example, in a further embodiment the second state may be the on state and the first state may be the off state, in accordance with the understanding of the skilled person.

The switching circuit 502 may comprise a flying capacitor 608 and may comprise an output capacitor 610. The output capacitor 610 is configured to provide the output voltage Vout and is charged when the switch 504 is in the on state. In this specific embodiment, the output capacitor 610 is charged by the flying capacitor 608 when the switch 504 is in the on state.

The charge pump 600 comprises a further three switches 612, 614, 616. The charge pump 600 comprises a switching pair (504+612) comprising the switches 504, 612; and the charge pump comprises a switching pair (614+616) comprising the switches 614, 616. The switch control circuit 506 is configured to selectively operate each of the switches 504, 612, 614, 616 in an on state or an off state.

The switching pair (504+612) is arranged to couple the flying capacitor 608 to the output capacitor 610 when the switches 504, 612 are in the on state, and the switches 614, 616 are in the off state. The switching pair (614+616) is arranged to couple the flying capacitor 608 to the input voltage Vin when the switches 614, 616 are in the on state and the switches 504, 612 are in the off state.

Figure 7:
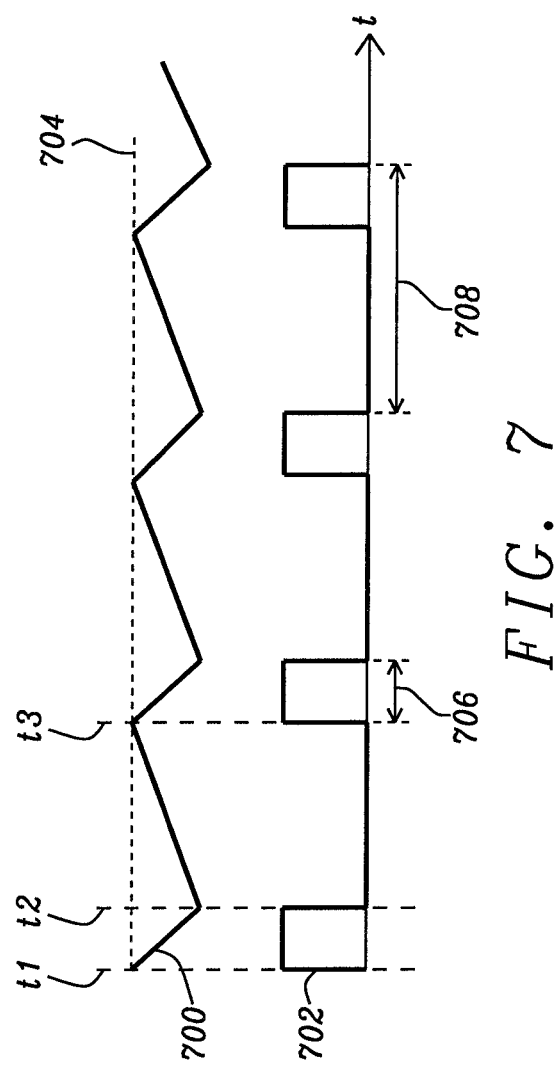
FIG. 7 is a graph showing the output voltage and the switching state of the charge pump of FIG. 6, as they vary with time.

FIG. 7 shows a graph of the output voltage Vout 700 of the charge pump 600 as it varies with time t; and shows a switching state 702 varying with time t, that illustrates the switching operation of the switches 504, 612, 614, 616. The switching state 702 may alternatively be referred to as an on time pulse. Also shown is the reference voltage Vref 704, which is the target voltage of the charge pump 600. The target voltage is the desired output of the charge pump 600.

A high signal of the switching state 702 denotes that the switches 504, 612 are in the on state and the switches 614, 616 are in the off state; a low signal of the switching state 702 denotes that the switches 614, 616 are in the on state and the switches 504, 612 are in the off state.

An on state duration 706, which is the period of time over which the switches 504, 612 are in the on state over a single switching period 708, is shown. The on state duration 706 corresponds to the first state duration as described previously. The switching period 708 is a period of time over a single switching cycle. For example, the switching period 708 is shown as the period of time from when the switches 504, 612 switch to the off state, to the time when they return to the off state after having switched to the on state.

It will be appreciated that in an alternative embodiment, the on state duration 706 may correspond to the second state duration as described previously.

Between a time t1 and a time t2, the switches 504, 612 are in the on state, and the switches 614, 616 are in the off state as shown by the switching state 702. The time from time t1 to time t2 is equal to the on state duration 706. Between the time t1 and the time t2, the output voltage Vout 700 decreases as the output capacitor 610 is charged by the flying capacitor 608.

At the time t2, the switch control circuit 506 switches the switches 504, 612 to the off state and the switches 614, 616 to the on state.

Between the time t2 and a time t3, the output voltage Vout 700 increases as the flying capacitor 608 is charged by the input voltage Vin. When the output voltage Vout 700 is equal to the reference voltage Vref 704, as occurs at the time t3, the comparator 602 provides the output signal to the switch control circuit 506, and in response to the output signal, the switch control circuit 506 switches the switches 504, 612 back to the on state and switches 614, 616 back to the off state. The switching cycle then repeats.

It can be observed that the duration of time from time t1 to time t3 is equal to the switching period 708.

Each of the power converters 500, 510, 600 described operates with a switching period that is dependent on a load current. The ripple reduction circuit 508 defines a suitable on state duration dynamically based on a property of the load current, which may be determined from the switching period. The ripple reduction circuit 508 acts to provide a reduced output voltage ripple over different load currents when compared with the prior art.

Figure 8A:
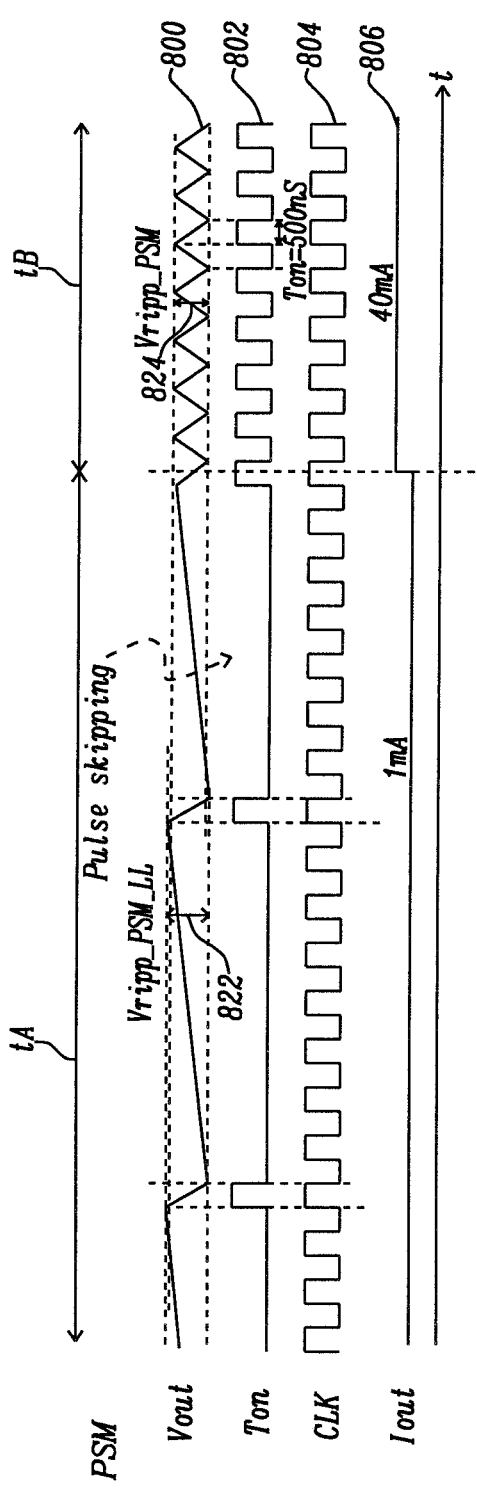
FIG. 8A is a graph of an output voltage, a switching state, a clock signal and a load current as they vary with time, for a PSM charge pump.
Figure 8B:
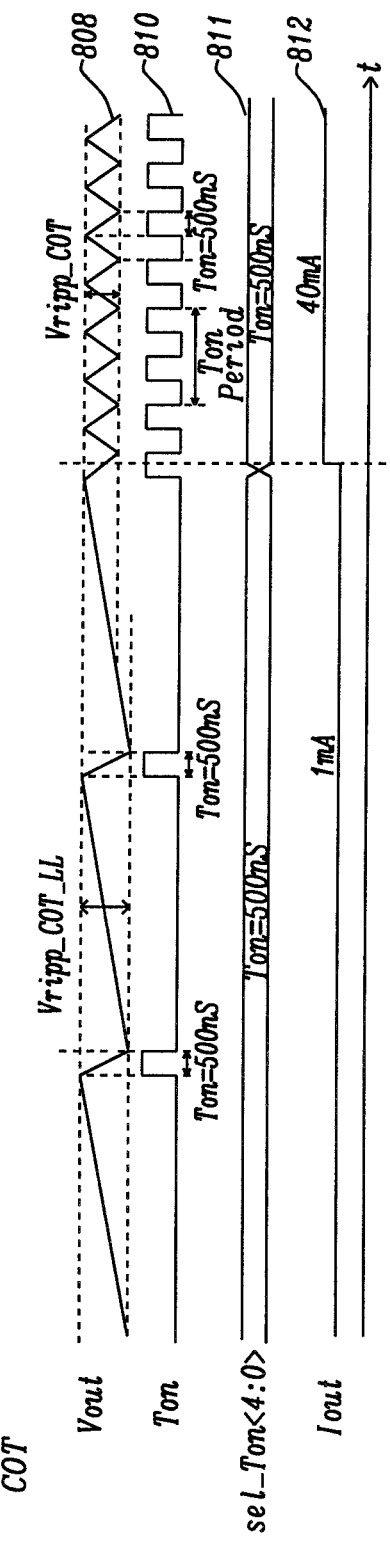
FIG. 8B is a graph of an output voltage, a switching state, an on state duration and a load current as they vary with time, for a constant on time (COT) charge pump.
Figure 8C:
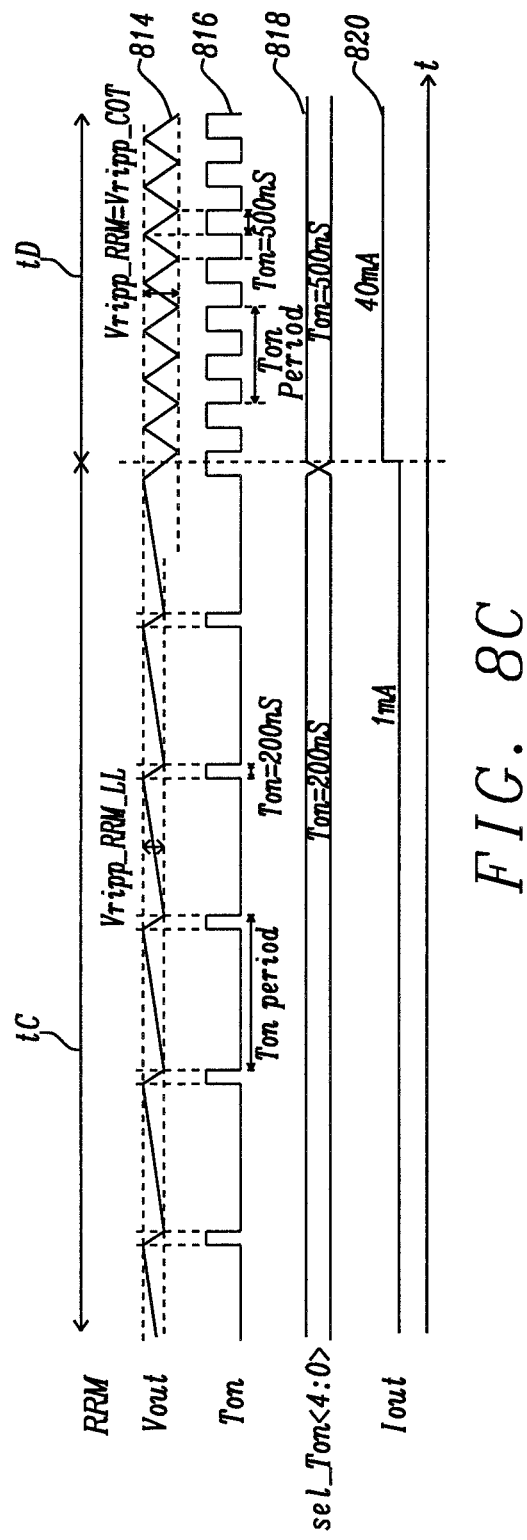
FIG. 8C is a graph of an output voltage, a switching state, an on state duration and a load current for the charge pump of FIG. 6.

FIGS. 8A-8C show simulation results illustrating the operation of a PSM charge pump, a COT charge pump and a charge pump in accordance with this present disclosure. Each of the simulated charge pumps are negative charge pumps. The simulations were performed using parameters that are representative of practical implementations of the charge pumps.

FIG. 8A shows a graph of an output voltage 800, a switching state 802, a clock signal 804 and a load current 806 as they vary with time t, for a PSM charge pump. FIG. 8B shows a graph of an output voltage 808, a switching state 810, an on state duration signal 811 and a load current 812 as they vary with time t, for a COT charge pump. FIG. 8C shows a graph of an output voltage 814, a switching state 816, an on state duration signal 818 and a load current 820 for the charge pump 600. It can be observed in FIG. 8C that the on state duration signal 818 varies as load current 820 and a switching period of the switching state 816 varies. The output voltage 814 corresponds to the output voltage 700, and the switching state 816 corresponds to the switching state 702 as described previously.

Figure 9B:
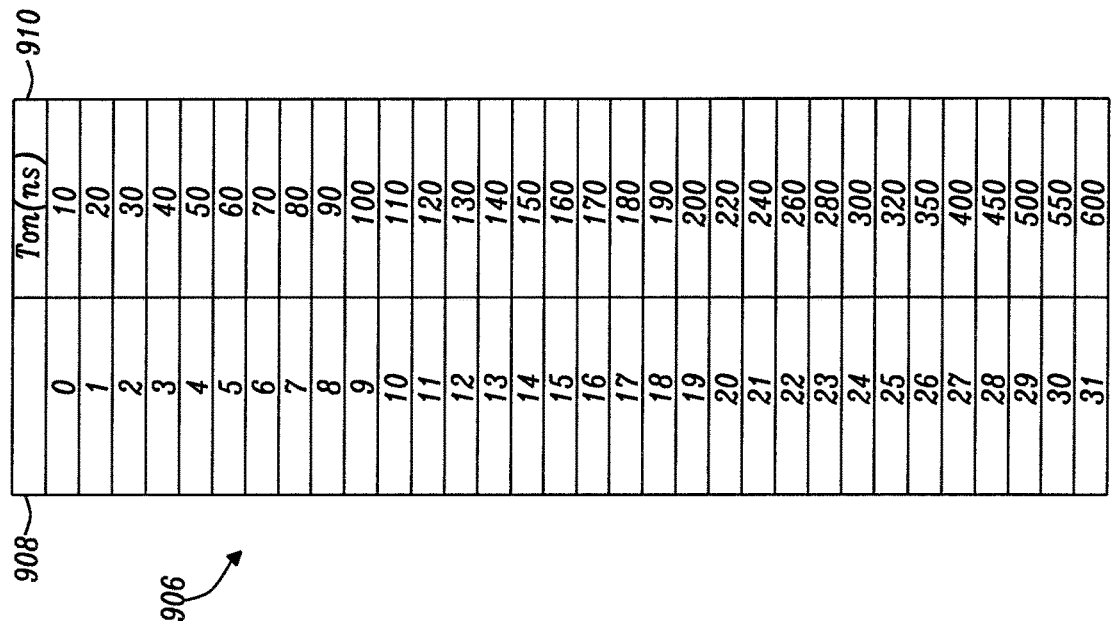
FIG. 9A is a schematic of a specific implementation of the ripple reduction circuit and FIG. 9B is a decision look up table.
Figure 9A:
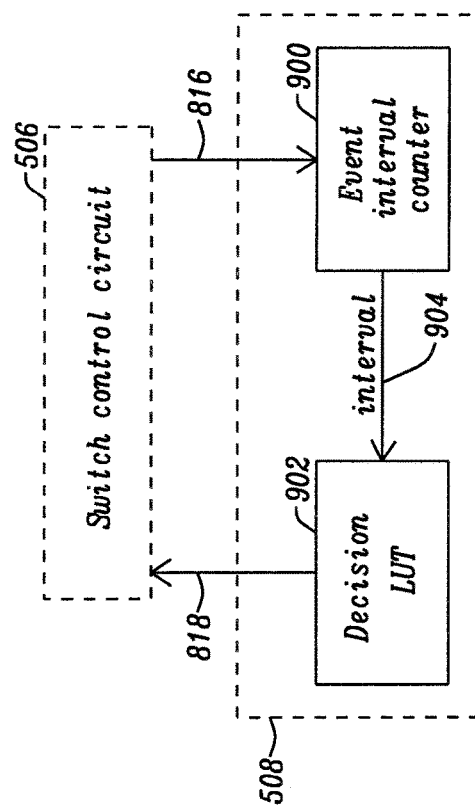

FIG. 9A shows a schematic of a specific implementation of the ripple reduction circuit 508. The ripple reduction circuit 508 comprises a counter circuit 900 and a look up table (LUT) circuit 902, which may be referred to as a decision LUT. The LUT circuit 902 comprises a look up table 906, as is shown in FIG. 9B.

In general terms, the counter circuit 900 is configured to detect the switching period of the switch 504 by detecting the state of the switch 504 and determining the switching period from the state of the switch 504.

The switching period of the switch 504 may, for example, be determined by determining a time period between a transition of the switch 504 from the second state to the first state and the next transition of the switch 504 from the second state to the first state.

The LUT circuit 902 is configured to receive a switching period signal from the counter circuit 900, and to set the first state duration based on the property of the load current, the property of the load current being determined from the switching period. The switching period signal comprises information relating the switching period as determined by the counter circuit 900.

The ripple reduction circuit 508 will now be described with reference to the specific embodiment shown in FIG. 9A and FIG. 9B. Signals provided to and from the ripple reduction circuit 508 are described with reference to the graph of FIG. 8C, however it will be appreciated that there are other suitable methods for determining a switching period and adjusting an on state duration, in accordance with the understanding of the skilled person.

The switch control circuit 506 outputs the switching state 816, which is provided to the counter circuit 900. From the switching state 816, the counter circuit 900 is configured to determine the switching period of the switching state 816.

The counter circuit 900 may be an event interval counter that is configured to determine an interval between two events. For example, the counter circuit 900 may measure a time period between receiving a high signal and receiving the next high signal of the switching state 816. As discussed for FIG. 7, and now with reference to FIG. 8C, a high signal of the switching state 816 denotes that the switches 504, 612 are in the on state and the switches 614, 616 are in the off state; a low signal of the switching state 816 denotes that the switches 614, 616 are in the on state and the switches 504, 612 are in the off state. Therefore, the time period in this case would corresponds to the switching period of the switching state 816.

The counter circuit 900 outputs a switching period signal 904 to the LUT circuit 902. The switching period signal 904 comprises information relating to the switching period of the switching state 816, as determined by the counter circuit 900.

The LUT circuit 902 comprises a look up table 906. The look up table comprises a column of row numbers 908 and a column of on state durations 910. Information on the switching period is provided to the LUT circuit 902 by the switching period signal 904. Based on the switching period, an on state duration is selected from the column of on state durations 910 and provided to the switch control circuit 506 by the on state duration signal 818. The on state duration is set to the on state duration that is selected from the LUT 906.

FIG. 10A shows how an output voltage 900 of a charge pump varies over a switching period 902. Also shown is the reference voltage Vref 904. The charge pump is of the type that generates an output voltage Vout 900 that is equal to twice its input voltage Vin. The charge pump comprises a flying capacitor 914, as is shown in FIG. 10B; and an output capacitor and a switch. As described for the charge pump 600, the output capacitor is charged by the flying capacitor 914 when the switch is in an on state.

The following description relating to FIGS. 10A and 10B may be generalised to apply to any of the PSM mode charge pump, the COT charge pump or the charge pump 600 as described previously.

For an on state duration 906, between a time t4 and a time t5, the output voltage Vout 900 increases by a rising ripple $\Delta V1$ 908; and for an off state duration 910, between the time t5 and a time t6, the output voltage Vout 900 decreases by a falling ripple $\Delta V2$ 912. FIG. 10B shows the voltages at each of the flying capacitor's 914 terminals at the time t4 and at the time t5. At time t4, the flying capacitor 914 has a first terminal at the input voltage Vin and a second terminal at twice the input voltage Vin. At the time t5, the flying capacitor 914 has the first terminal at the input voltage Vin and a second terminal at the reference voltage Vref plus the rising ripple $\Delta V1$. The flying capacitor 914 of the charge pump is discharged to the output capacitor during the on state duration 906 and the flying capacitor 914 is charged by the input voltage Vin during the off state duration 910.

Assuming that an on resistance Rdson of the switch is sufficiently small, a change in charge $\Delta Q$ of the flying capacitor 914 from the time t4 to the time t5 may be determined as follows.

$$Q_{t4} = V\text{in} \times Cf \quad (1)$$

$$Q_{t5} = (V\text{ref} + \Delta V1 - V\text{in}) \times Cf \quad (2)$$

$$\Delta Q = Q_{t4} - Q_{t5} = (2V\text{in} - V\text{ref} - \Delta V1) \times Cf \quad (3)$$

where $Q_{t4}$ is the charge on the flying capacitor 914 at the time t4, $Q_{t5}$ is the charge on the flying capacitor 914 at the time t5 and Cf is a capacitance of the flying capacitor 914. $\Delta Q$ is also the total charge received by the flying capacitor 914 from an input voltage over a time period T.

Additionally, the total charge $\Delta Q$ drawn by a load current Iload over the time period T may be written as follows:

$$\Delta Q = I\text{load} \times T \quad (4)$$

When in steady state, the charge from the input voltage Vin should be equal to the charge drawn from the loading current Iload, such that equations (3) and (4) may be combined to determine the rising ripple ΔV1 as follows:

$$\Delta V1 = 2Vin - Vref \frac{Iload \times T}{Cf} \quad (5)$$

The falling ripple ΔV2 is as follows:

$$\Delta V2 = \frac{Iload \times Toff}{Cout} \quad (6)$$

where Toff is the off state duration and Cout is a capacitance of the output capacitor. In the steady state, where there are no variations in the load current Iload, the rising ripple ΔV1 is approximately equal to the falling ripple ΔV2 such that a switching period T is as follows:

$$T = \frac{2Vin - Vref}{\frac{Iload}{Cout} \times \left(1 + \frac{Cout}{Cf}\right)Cf} + \frac{Ton}{\left(1 + \frac{Cout}{Cf}\right)} \quad (7)$$

where Ton is the on state duration. From equations (5) and (7), the voltage ripple ΔV is as follows:

$$\Delta V = \Delta V1 = \Delta V2 = \frac{Iload \times Toff}{Cout} = \quad (8)$$
$$\frac{Iload \times (T - Ton)}{Cout} = \frac{(2Vin - Vref) \times Cf}{Cf + Cout} - \frac{Iload \times Ton}{Cf + Cout}$$

The voltage ripple ΔV is the change in the output voltage Vout from the reference voltage Vref over a switching period T. Inclusion of the on resistance Rdson of the switch yields the following equation for the voltage ripple ΔV(t), where the voltage ripple is a function of time t.

$$\Delta V(t) = \frac{(2Vin - Vref) \times Cf}{Cf + Cout}\left[1 - e^{\frac{-Ton}{2 \times Rdson\left(\frac{Cf \times Cout}{Cf+Cout}\right)}}\right] - \frac{Iload \times Ton}{Cf + Cout} \quad (9)$$

Equation (9) may be generalised, as shown in equation (10):

$$\Delta V(t) = \frac{(K \times Vin - Vref) \times Cf}{Cf + Cout}\left[1 - e^{\frac{-Ton}{2 \times Rdson\left(\frac{Cf \times Cout}{Cf+Cout}\right)}}\right] - \frac{Iload \times Ton}{Cf + Cout} \quad (10)$$

where K is equal to 2 for a charge pump having Vout=Vin×2, as shown in equation (9). K is equal to 1 for a charge pump having Vout=Vin×(−1), for example the PSM mode charge pump, the COT charge pump or the charge pump 600 as described previously.

When applying equation (10) to the charge pump 600, the flying capacitor 914 may correspond to the flying capacitor 608, the switch may correspond to the switch 504 and the output capacitor may correspond to the output capacitor 610.

From equations (9) and (10) it can be seen that the voltage ripple ΔV(t) is dependent on the load current Iload such that as load current Iload decreases, the voltage ripple ΔV(t) increases.

In FIG. 8A, the load current 806 over a time period tA is equal to 1 mA, and the load current 806 over a time period tB is equal to 40 mA. The voltage ripple of the output voltage 800 (shown at reference numeral 822) during the time period tA is greater than the output voltage ripple (shown at reference numeral 824) during the time period tB, in accordance with equation (10). Similarly, in FIG. 8B, the voltage ripple is greater at a light load (for example, at 1 mA as shown), than the voltage ripple at a heavy load (for example, at 40 mA as shown).

The on state duration and the switching period are as described for FIG. 7. As seen by the switching states 802, 810, the switching period for each of the PSM charge pump and the COT charge pump decreases as the load current Iload increases, and the on state duration remains unchanged as the load current Iload changes.

From equations (9) and (10) it can be seen that the output voltage ripple ΔV(t) varies with the on state duration Ton, such that a shorter on state duration Ton results in a reduced output voltage ripple ΔV(t). Therefore by varying the on state duration Ton as load current Iload varies, it is possible to compensate for the effect of increased output voltage ripple ΔV(t) due to the load current Iload. This disclosure provides a means of reducing the output voltage ripple ΔV(t) by changing the on state duration Ton based on a property of the load current Iload, as described for the power converters 500, 510, 600. Using the ripple reduction circuit 508 it is possible to have a substantially constant output voltage ripple ΔV(t) for different load currents Iload.

As shown in FIG. 8C, at a time period tC, there is a load current of 1 mA and at a time period tD there is a load current of 40 mA. The switching state 816 shows that the on state duration Ton is equal to 200 ns during the time period tC and is equal to 500 ns during the time period tD. The reduction in on state duration Ton for the load current of 1 mA results in a decreased output voltage ripple ΔV(t) when compared to FIG. 8B.

As an additional effect, the reduction in output voltage ripple leads to a reduction in the required power supply rejection ratio (PSRR) of a circuit that uses the charge pump 600 as its power supply.

The ripple reduction circuit 508 provides a method of reducing the output voltage ripple.

Figure 11:
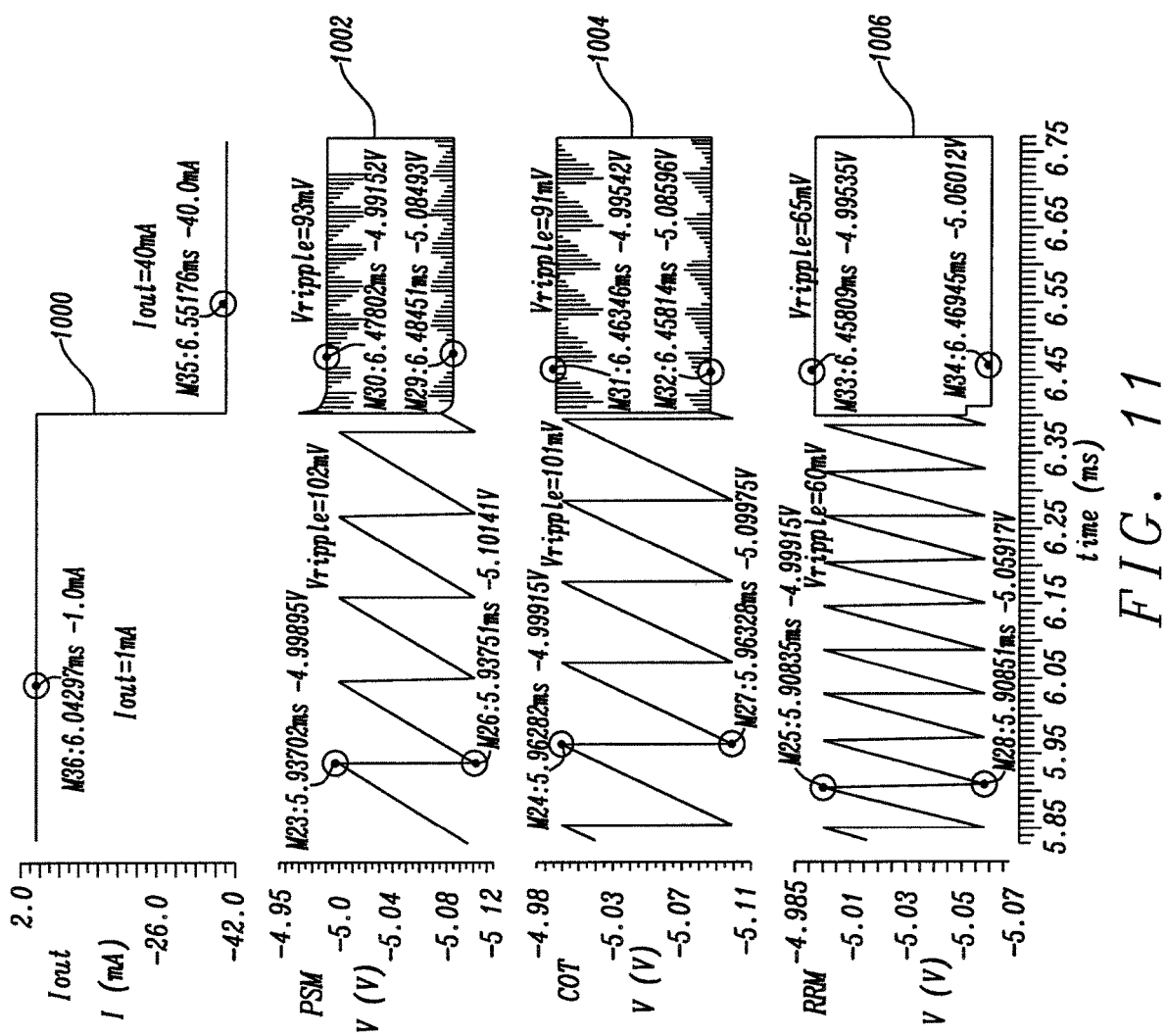
FIG. 11 shows simulation results of a load current and output voltages of a PSM charge pump, a COT charge pump and the charge pump of FIG. 6, as they vary with time.

FIG. 11 shows simulation results for a PSM charge pump, a COT charge pump and the charge pump 600. The simulations were performed using parameters that are representative of practical implementations of the charge pumps. Shown is a load current 1000 that varies from 1 mA to 40 mA; an output voltage 1002 of the PSM charge pump; and output voltage 1004 of the COT charge pump; and an output voltage 1006 of the charge pump 600. It can be observed that the charge pump 600 exhibits a smaller output voltage ripple than each of the PSM charge pump and the COT charge pump over the load current 1000 range. At a load current 1000 of 1 mA, the output voltage ripple of the PSM charge pump is equal to 102 mV; the output voltage ripple of the COT charge pump is equal to 101 mV; and the output voltage ripple of the charge pump is 60 mV. At a load current 1000 of 40 mA, the output voltage ripple of the PSM charge pump is equal to 93 mV; the output voltage ripple of the COT charge pump is 91 mV; and the output voltage ripple of the charge pump is 65 mV.

Figure 12:
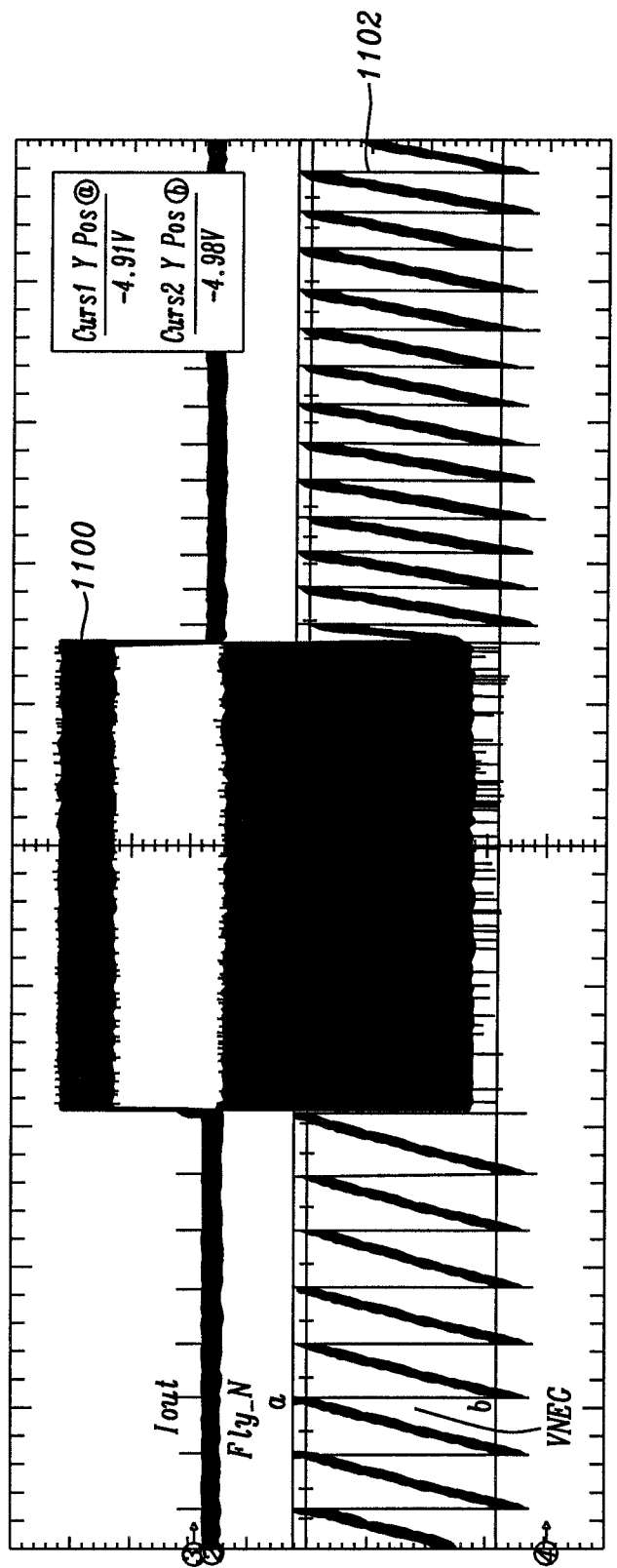
FIG. 12 shows experimental results of a load current and an output voltage of a PSM charge pump, as they vary with time.
Figure 13:
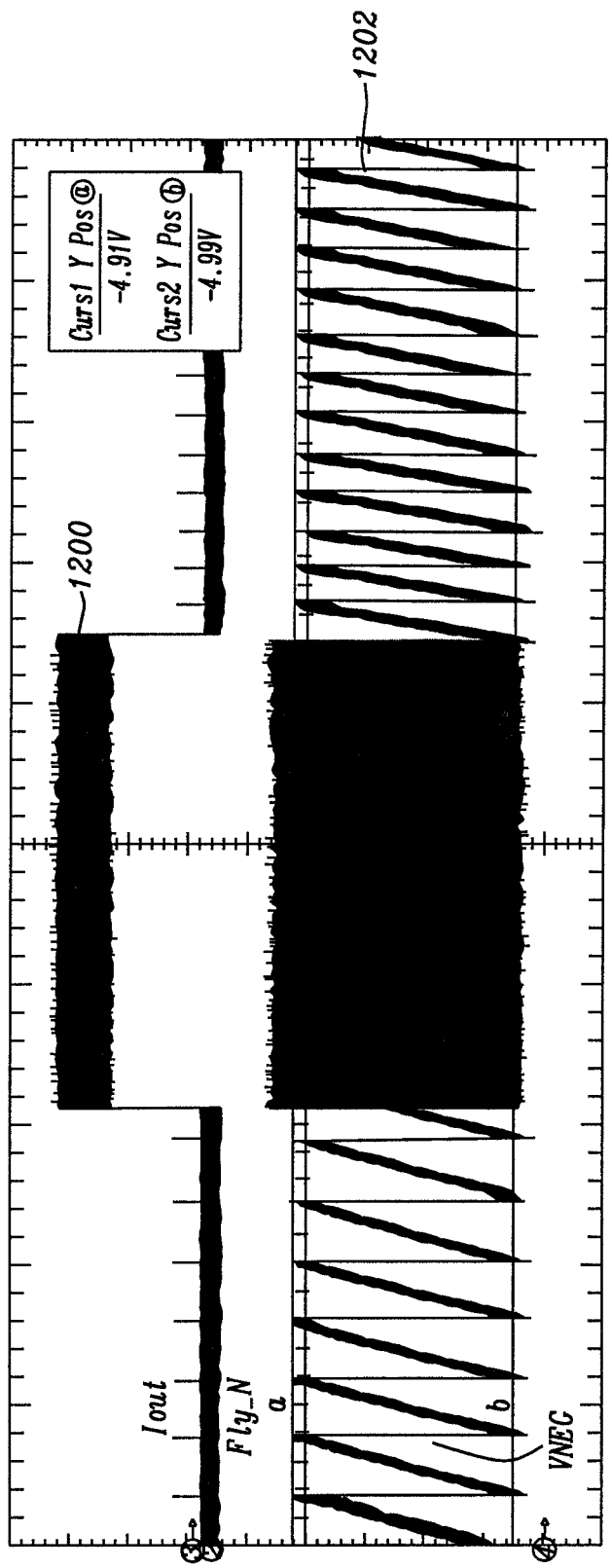
FIG. 13 shows experimental results of a load current and an output voltage of a COT charge pump, as they vary with time.
Figure 14:
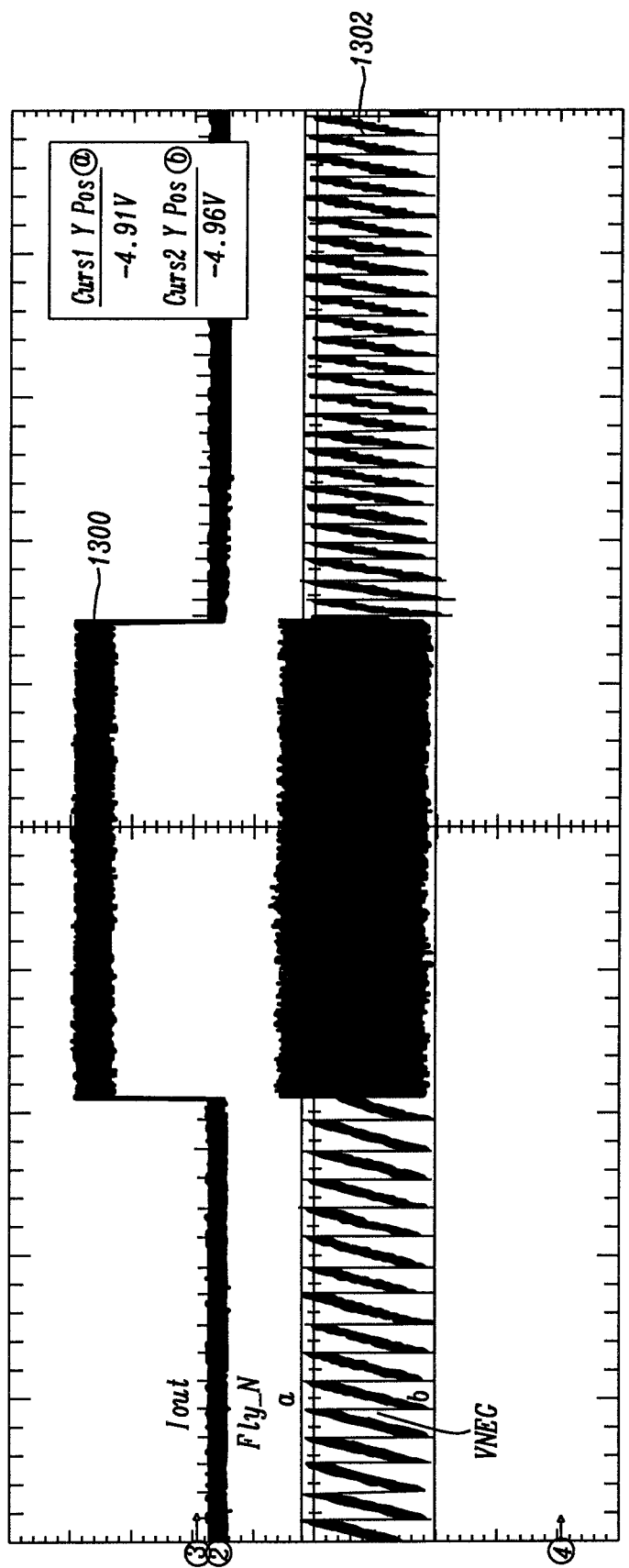
FIG. 14 shows experimental results of a load current and an output voltage of the charge pump of FIG. 6 as they vary with time.

FIGS. 12, 13 and 13 shows experimental results of a load transient for the PSM charge pump, the COT charge pump and the charge pump 600, respectively. The "load transient" describes a change in the load current from one value to another value. A load current is labelled by reference numerals 1100, 1200, 1300 in FIGS. 12,13 and 14, respectively, and an output voltage is labelled by reference numerals 1102, 1202, 1302 in FIGS. 12,13 and 14, respectively. Shown by the output voltages 1102, 1202, 1302, it can be observed that the PSM charge pump exhibits a maximum output voltage ripple of 110 mV; the COT charge pump exhibits a maximum output voltage ripple of 94 mV; and the charge pump 600 exhibits a maximum output voltage ripple of 61 mV.

Figure 15:
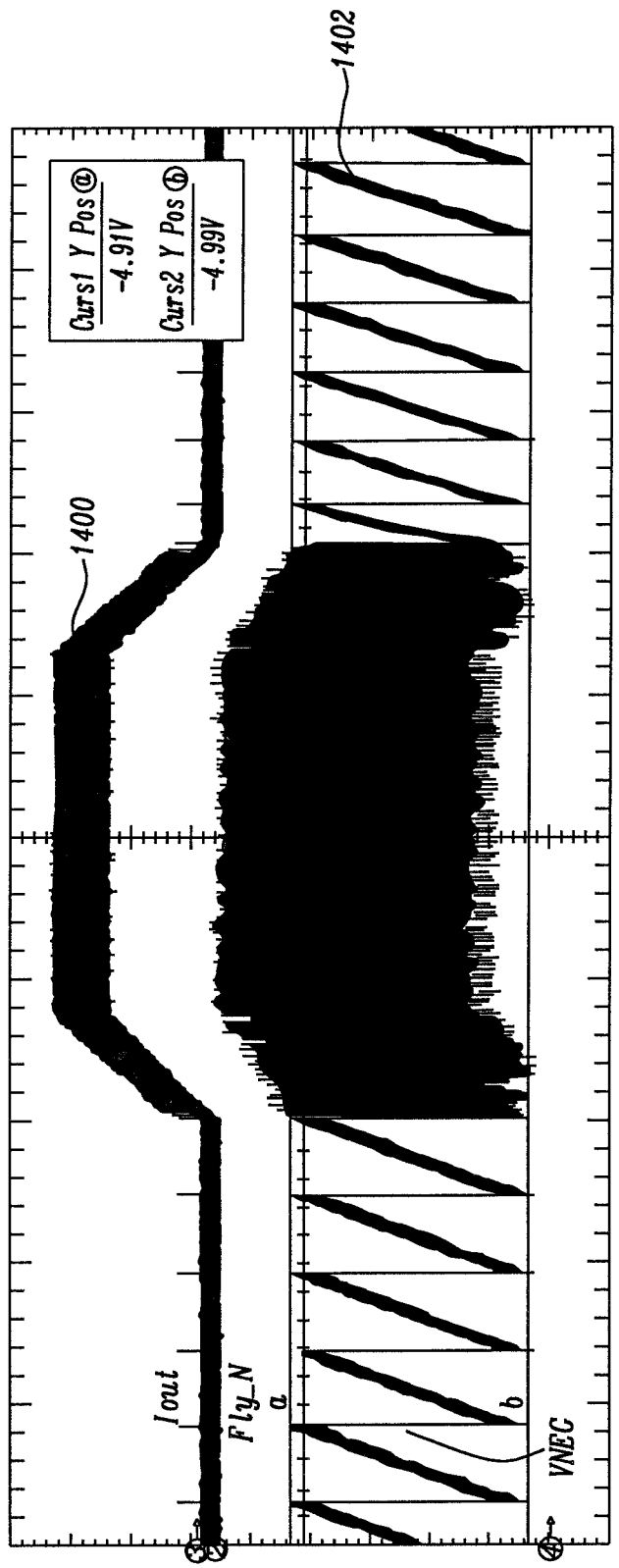
FIG. 15 shows experimental results of a load regulation of a PSM charge pump.
Figure 16:
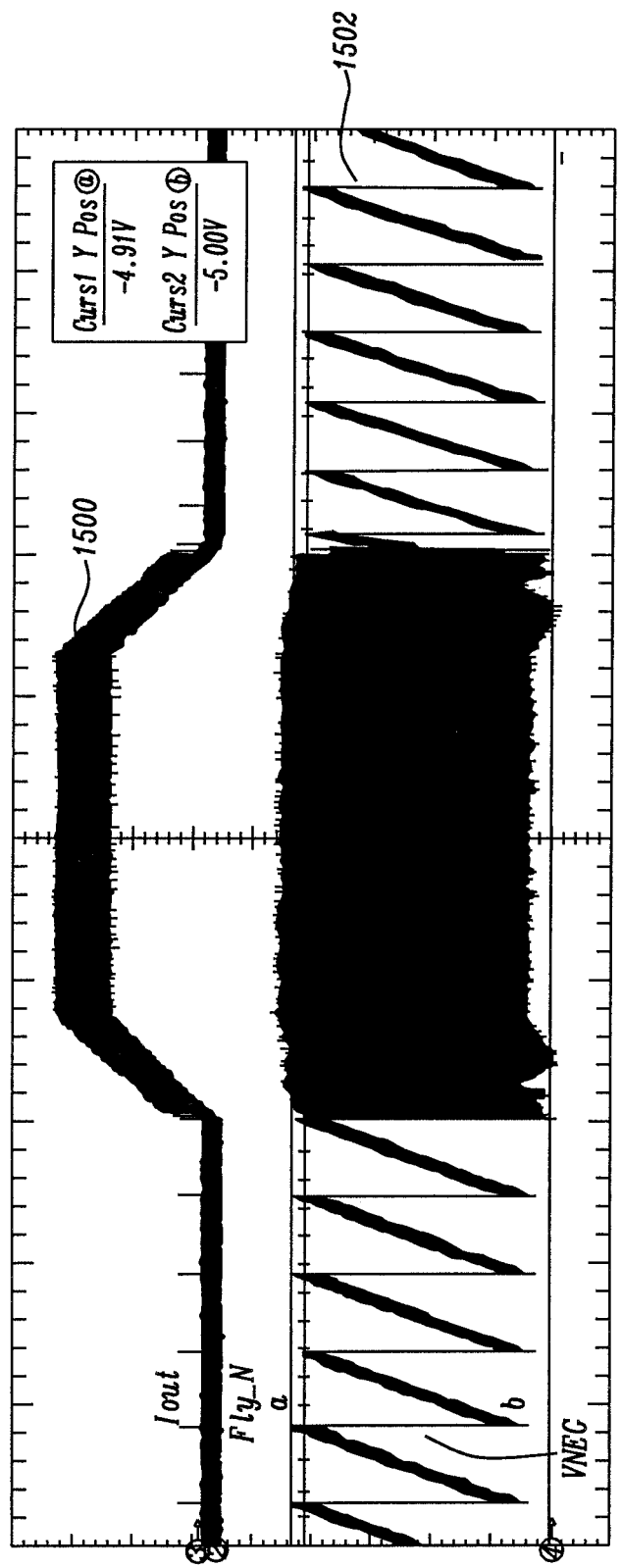
FIG. 16 shows experimental results of a load regulation of a COT charge pump.
Figure 17:
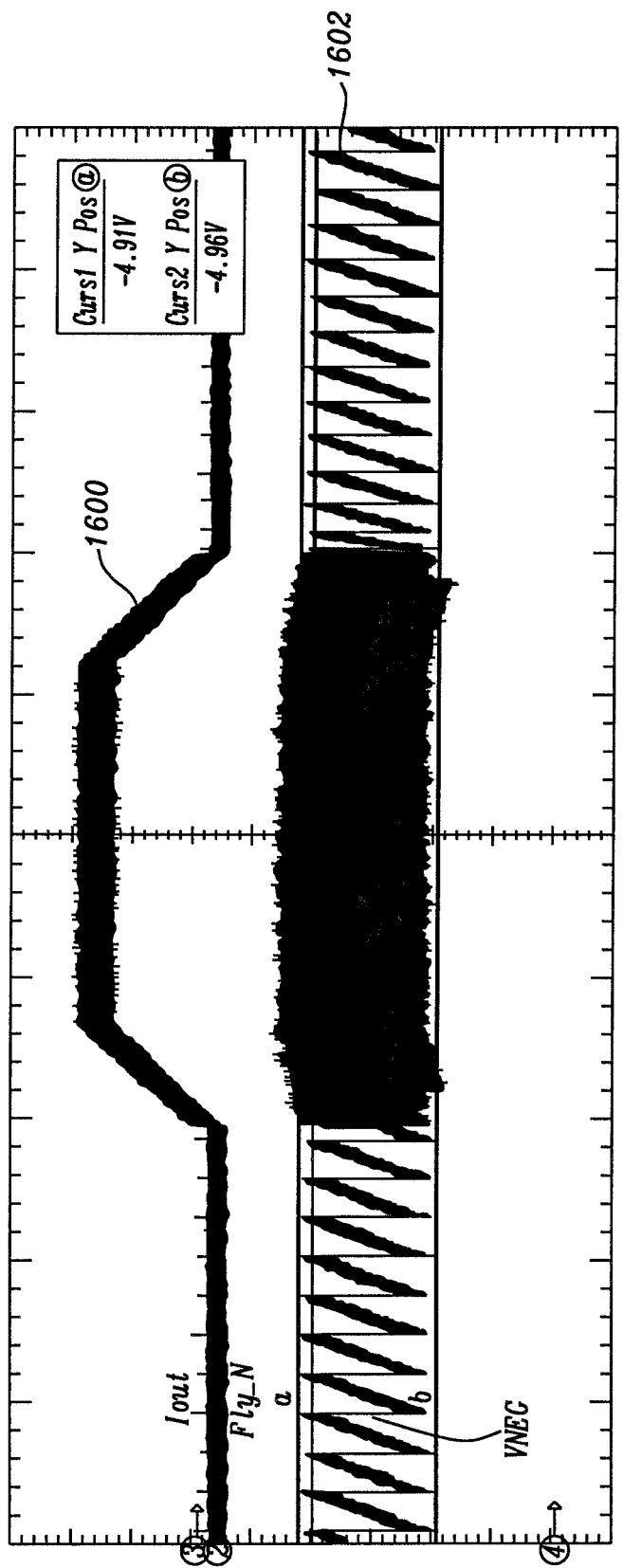
FIG. 17 shows experimental results of a load regulation of the charge pump of FIG. 6.

FIGS. 15, 16 and 17 shows experimental results relating to measurement of a load regulation for each of the PSM charge pump, the COT charge pump and the charge pump 600. The "load regulation" is a measure of the sensitivity of the output voltage of a voltage regulator to variations in the load current. A load current is labelled by reference numerals 1400, 1500, 1600 in FIGS. 15, 16, and 17, respectively, and an output voltage is labelled by reference numerals 1402, 1502, 1602 in FIGS. 15, 16 and 17, respectively.

Shown by the output voltages 1402, 1502, 1602, it can be observed that the PSM charge pump exhibits a maximum output voltage ripple of approximately 90 mV; the COT charge pump exhibits a maximum output voltage ripple of approximately 80 mV; and the charge pump 600 exhibits a maximum output voltage ripple of approximately 50 mV.

Figure 18:
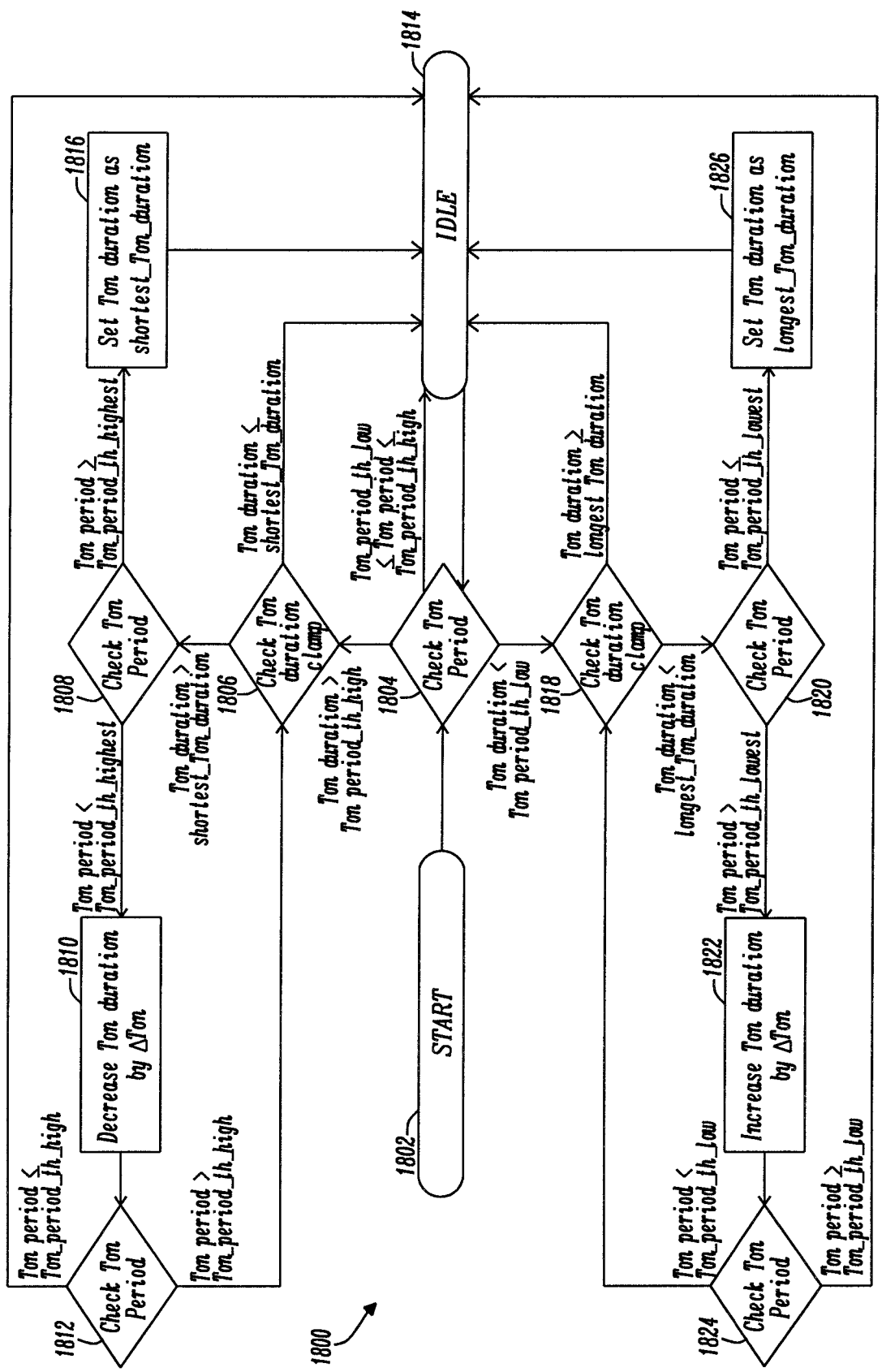
FIG. 18 is a flow chart of an algorithm defining the operation of the charge pump of FIG. 6.
Figure 19:
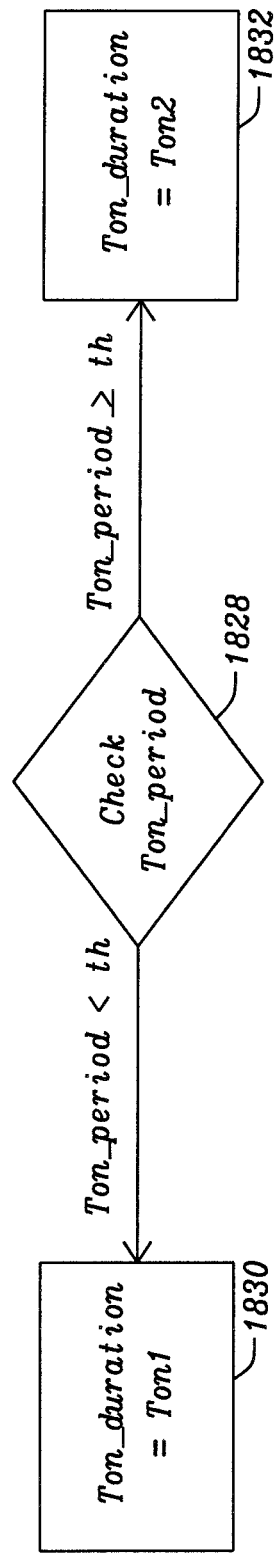
FIG. 19 is a flow chart of the general operation of the algorithm shown in FIG. 18.
Figure 20:
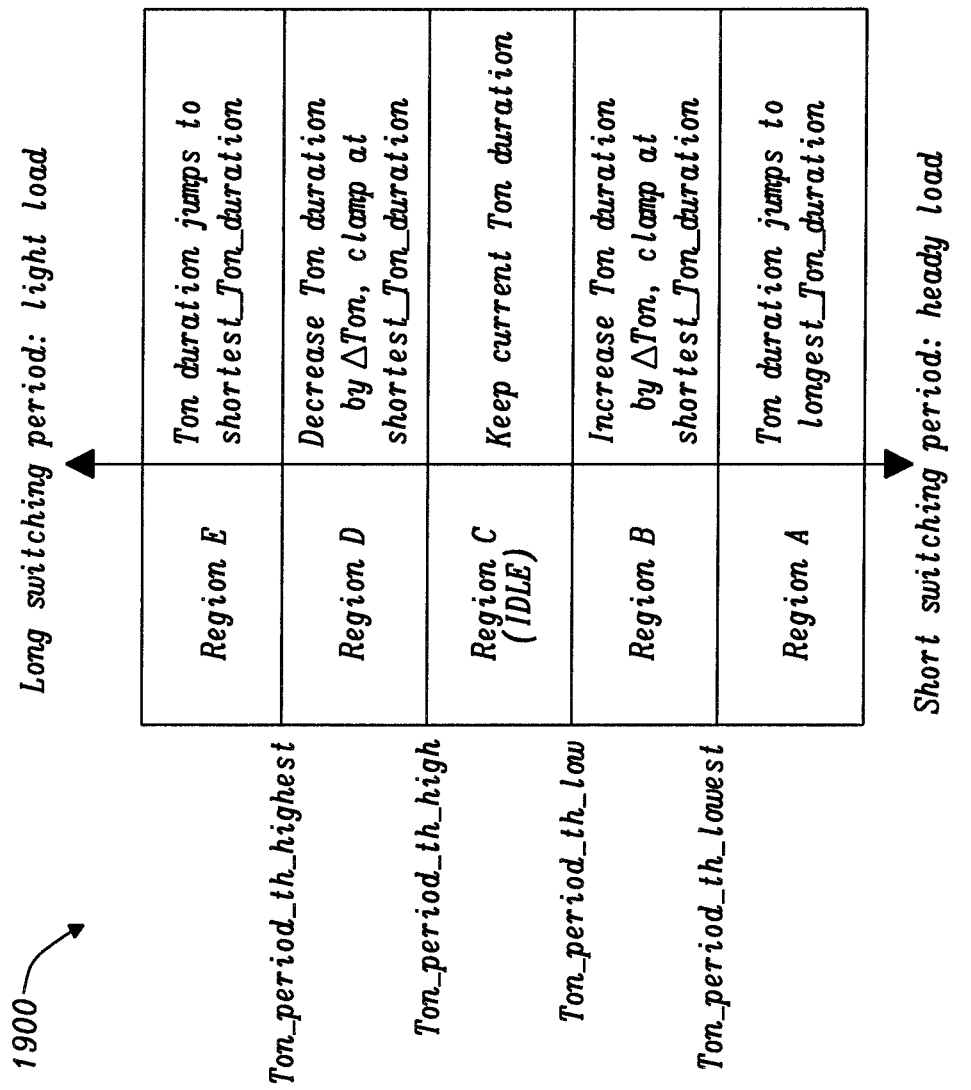
FIG. 20 is an alternative representation of the algorithm shown in FIG. 18.

The algorithm used to set the on state duration in the specific embodiment of the charge pump 600 is described in FIGS. 18,19 and 20.

FIG. 18 shows a flow chart 1800 of an algorithm defining the operation of the charge pump 600. At START 1802, we move to a step 1804. At step 1804, a switching period Ton_period is checked and if the switching period Ton_period is greater than a threshold value Ton_period_thhigh, we move to step 1806. At step 1806 an on state duration Ton_duration is checked and if the on state duration Ton_duration exceeds a threshold duration value shortest_Ton_duration, we move to a step 1808. At step 1808, the switching period Ton_period is checked and if the switching period Ton_period is less than a threshold value Ton_period_th_highest, the on state duration Ton_duration is decreased by a duration increment ΔTon at step 1810. We then move to a step 1812 where the switching period Ton_period is checked. If the switching period Ton_period is greater than the threshold value Ton_period_th_high then we return to step 1806. If the switching period Ton_period is less than or equal to the threshold value Ton_period_th_high then we move from step 1812 to IDLE 1814. From IDLE 1814 we move to step 1804. If the switching period Ton_period is less than or equal to the threshold value Ton_period_th_high and greater than or equal to a threshold value Ton_period_thlow then we return to IDLE 1814.

Returning to step 1806, if the on state duration Ton_duration is less than or equal to the threshold duration value shortest_Ton_duration then we move to IDLE 1804. Returning to step 1808, if the switching period Ton_period is greater than or equal to the threshold value Ton_period_th_highest then we move to a step 1816. At step 1816 the on state duration Ton_duration is set to a duration value shortest_Ton_duration and we move to IDLE 1814.

At step 1804, if the switching period Ton_period is less than the threshold value Ton_period_th_low then we move to a step 1818. At step 1818 the on state duration Ton_duration is check and if the on state duration Ton_duration is less than a threshold duration value longest_Ton_duration, we move to a step 1820. At step 1820, the switching period Ton_period is checked and if the switching period Ton_period is greater than a threshold value Ton_period_thlowest, the on state duration Ton_duration is increased by the duration increment ΔTon at step 1822. We then move to a step 1824 where the switching period Ton_period is checked. If the switching period Ton_period is less than the threshold value Ton_period_thlow then we return to step 1818. If the switching period Ton_period is greater than or equal to the threshold value Ton_period_th_low then we move from step 1824 to IDLE 1814.

Returning to step 1818, if the on state duration Ton_duration is greater than or equal to the threshold duration value longest_Ton_duration then we move to IDLE 1804. Returning to step 1820, if the switching period Ton_period is less than or equal to the threshold value Ton_period_th_lowest then we move to a step 1826. At step 1826 the on state duration Ton_duration is set to a duration value longest_Ton_duration and we move to IDLE 1814.

In a specific embodiment, the threshold value Ton_period_th_highest is slightly less than the switching period Ton_period at a load current of 1 mA. The threshold value Ton_period_th_high is less than the threshold value Ton_period_th_highest and greater than the threshold value Ton_period_th_low, to provide a hysteresis effect. The threshold value Ton_period_thlow is less than the threshold value Ton_period_th_high, to provide a hysteresis effect and greater than the threshold value Ton_period_th_lowest. The threshold value is slightly greater than the switching period Ton_period at the largest load current, for example 40 mA.

The duration value shortest_Ton_duration is dependent on the required output voltage ripple specification at a light load current; and the duration value longest_Ton_duration is dependent on the maximum load current. The duration increment ΔTon is dependent on the resolution.

It will be appreciated that other embodiments of algorithm are possible, in accordance with the understanding of the skilled person. For example, there may be more or less threshold values.

FIG. 19 shows a flow chart of the algorithm illustrating the general operation of the charge pump 600. At step 1828 the switching period Ton_period is checked. The on state duration Ton_duration is set to a first value Ton when the switching period Ton_period is less than a threshold value Th (shown at step 1830); and the on state duration Ton_duration is set to a second value Ton2 when the switching period is greater than or equal to the threshold value Th (shown at step 1832).

FIG. 20 shows an alternative representation of the algorithm 1900 shown in FIG. 18.

It will be appreciated that the algorithm described in FIGS. 18, 19 and 20 may be implemented in any other suitable power converter, for example the charge pumps 500, 510, in accordance with the understanding of the skilled person.

In the embodiments presented, the on state duration has been adjusted based on a property of the load current. It will be appreciated that in a further embodiment an off state duration may be adjusted based on a property of the load current. The embodiment may, for example, share features with a constant off time (CFT) charge pump and include a suitable ripple reduction circuit adjust the off state duration based on a property of the load current.

Additionally, the ripple reduction circuit 508 may be applied to power converters other than charge pumps. For example: buck converters, buck-boost converters and boost converters. FIG. 21A shows an asynchronous buck converter 2100 comprising the ripple reduction circuit 508 and FIG. 21B shows a synchronous buck converter 2102 comprising the ripple reduction circuit 508, in accordance with further embodiments of this disclosure. Common features between the power converter 500 and the power converters 2100, 2102 are represented by common reference numerals.

For the buck converter 2100, the switching circuit 502 comprises an inductor 2104, a diode 2106, a capacitor 2108 and is coupled to a load 2110. For the buck converter 2102, the switching circuit 502 comprises an inductor 2112, a switch 2114, a capacitor 2116 and is coupled to a load 2118.

FIG. 22A shows a graph of an output voltage 2200, a switching state 2202, an on state duration signal 2204 and a load current 2206 as they vary with time t, for a COT buck converter. FIG. 22B shows a graph of an output voltage 2208, a switching state 2210, an on state duration signal 2212 and a load current 2214 for either one of the buck converters 2100, 2102. It can be observed in FIG. 22B that the on state duration signal 2212 varies as load current 2214 and a switching period of the switching state 2210 varies.

Various improvements and modifications may be made to the above without departing from the scope of the disclosure.

What is claimed is:

1. A power converter for receiving an input voltage and providing an output voltage, the power converter comprising:
a switching circuit configured to generate the output voltage, the switching circuit comprising a first switch;
a switch control circuit arranged to selectively operate the first switch in a first state or a second state; and
a ripple reduction circuit configured to:
  i) detect a switching period of the first switch when the power converter is operating in an equilibrium condition:
  ii) determine a property of a steady state load current from the switching period, the steady state load current is a current that the power converter provides to a load that is coupled to the output voltage when the power converter is operating in the equilibrium condition; and:
  iii) set a first state duration based on a property of the steady state load current determined from the switching period.

2. The power converter of claim 1, wherein the first state is an on state and the second state is an off state.

3. The power converter of claim 1, wherein the switch control circuit switches the first switch from the second state to the first state when a condition is met, the condition relating to a comparison between the output voltage and a reference voltage.

4. The power converter of claim 3, wherein the condition comprises the output voltage being approximately equal to the reference voltage.

5. The power converter of claim 3 comprising:
a voltage comparison circuit configured to receive the output voltage and a reference voltage and to provide an output signal to the switch control circuit; wherein:
the output signal is dependent on the comparison between the output voltage and the reference voltage.

6. The power converter of claim 5, wherein the voltage comparison circuit comprises a comparator.

7. The power converter of claim 1, wherein:
the first state duration is set to a first value when the switching period is less than a first threshold value; and
the first state duration is set to a second value when the switching period is greater than or equal to the first threshold value.

8. The power converter of claim 1, wherein:
the switching circuit comprises an output capacitor configured to provide the output voltage; and
the output capacitor is charged when the first switch is in the first state.

9. The power converter of claim 8, wherein:
the switching circuit comprises a flying capacitor; and
the output capacitor is charged by the flying capacitor when the first switch is in the first state.

10. The power converter of claim 9, wherein the switching circuit comprises:
a first switching pair comprising the first switch and a second switch; and
a second switching pair comprising a third switch and a fourth switch; wherein:
the switch control circuit is arranged to selectively operate each of the second switch, the third switch and the fourth switch in a first state or a second state;
the first switching pair is arranged to couple the flying capacitor to the output capacitor when the first switch and the second switch are in the first state and the third switch and the fourth switch are in the second state; and
the second switching pair is configured to couple the flying capacitor to the input voltage when the third switch and the fourth switch are in the first state and the first switch and the second switch are in the second state.

11. The power converter of claim 1, wherein the power converter is a charge pump.

12. The power converter of claim 1, wherein the ripple reduction circuit comprises a counter circuit configured to detect the switching period of the first switch by:
detecting the state of the first switch; and
determining the switching period from the state of the first switch.

13. The power converter of claim 12, wherein determining the switching period from the state of the first switch comprises:
determining a time period between a transition of the first switch from the second state to the first state and a next transition of the first switch from the second state to the first state.

14. The power converter of claim 12, wherein the ripple reduction circuit comprises a look up table circuit configured to receive a switching period signal from the counter circuit, and to set the first state duration based on the property of the steady state load current, the property of the steady state load current being determined from the switching period, wherein the switching period signal comprises information relating the switching period.

15. A ripple reduction circuit for a power converter for receiving an input voltage and providing an output voltage, the power converter comprising:
a switching circuit configured to generate the output voltage, the switching circuit comprising a first switch; and
a switch control circuit arranged to selectively operate the first switch in a first state or a second state; wherein:
the ripple reduction circuit configured to:
  i) detect a switching period of the first switch when the power converter is operating in an equilibrium conidtion;
  ii) determine a property of a steady state load current from the switching period, the steady state load current is a current that the power converter provides to a load that is coupled to the output voltage when the power converter is operating in the equilibrium condition; and:

iii) set a first state duration based on a property of the steady state load current determined from the switching period.

16. A method of power conversion using a power converter for receiving an input voltage and providing an output voltage, the method comprising:
   generating the output voltage using a switching circuit, the switching circuit comprising a first switch;
   selectively operating the first switch in a first state or a second state using a switch control circuit; and
   detecting a switching period of the first switch when the power converter is operating in an equilibrium condition using a ripple reduction circuit:
   determining a property of a steady state load current from the switching Period using the ripple reduction circuit, the steady state load current is a current that the power converter provides to a load that is coupled to the output voltage when the power converter is operation in the equilibrium condition; and
   setting a first state duration based on a property of the steady state load current determined from the switching period using the ripple reduction circuit.

17. A method of ripple reduction using a ripple reduction circuit for a power converter for receiving an input voltage and providing an output voltage, the power converter comprising:
   a switching circuit to generate the output voltage, the switching circuit comprising a first switch; and
   a switch control circuit arranged to selectively operate the first switch in a first state or a second state; the method comprising:
   detecting a switching period of the first switch when the power converter is operating in an equilibrium condition using a ripple reduction circuit;
   determining a property of a steady state load current from the switching period using the ripple reduction circuit, the steady state load current is a current that the power converter provides to a load that is coupled to the output voltage when the power converter is operating in the quilibrium condition; and
   setting a first state duration based on a property of the steady state load current determined from the switching period using the ripple reduction circuit.

18. The method of claim 16, wherein the first state is an on state and the second state is an off state.

19. The method of claim 16, wherein the switch control circuit switches the first switch from the second state to the first state when a condition is met, the condition relating to a comparison between the output voltage and a reference voltage.

20. The method of claim 19, wherein the condition comprises the output voltage being approximately equal to the reference voltage.

21. The method of claim 19 further comprising the steps of:
   receiving with a voltage comparison circuit the output voltage and a reference voltage and
   providing with a voltage comparison circuit an output signal to the switch control circuit; wherein:
   the output signal is dependent on the comparison between the output voltage and the reference voltage.

* * * * *

UNITED STATES PATENT AND TRADEMARK OFFICE
CERTIFICATE OF CORRECTION

| | | |
|---|---|---|
| PATENT NO. | : 10,886,834 B1 | Page 1 of 2 |
| APPLICATION NO. | : 16/119429 | |
| DATED | : January 5, 2021 | |
| INVENTOR(S) | : Der Ju Hung et al. | |

It is certified that error appears in the above-identified patent and that said Letters Patent is hereby corrected as shown below:

In the Claims

Column 16, Line 50, cancel the text beginning with "15. A ripple reduction circuit for a power converter for" to and ending "ing period." in Column 17, Line 3, and insert the following claim:
--15. A ripple reduction circuit for a power converter for
receiving an input voltage and providing an output voltage,
the power converter comprising:
a switching circuit configured to generate the output
voltage, the switching circuit comprising a first switch;
and
a switch control circuit arranged to selectively operate the
first switch in a first state or a second state; wherein:
the ripple reduction circuit configured to:
i)     detect a switching period of the first switch when the
power converter is operating in an equilibrium
condition;
ii)    determine a property of a steady state load current
from the switching period, the steady state load
current is a current that the power converter provides
to a load that is coupled to the output voltage when
the power converter is operating in the equilibrium
condition; and:
iii)   set a first state duration based on a property of the
steady state load current determined from the switch-
ing period.--

And in Column 17, Line 4, cancel the text beginning with "16. A method of power conversion using a power con-" to and ending "period using the ripple reduction circuit." in Column 17, Line 22, and insert the following claim:
--16. A method of power conversion using a power con- Signed and Sealed this
Thirteenth Day of July, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,886,834 B1 verter for receiving an input voltage and providing an output voltage, the method comprising:
generating the output voltage using a switching circuit, the switching circuit comprising a first switch;
selectively operating the first switch in a first state or a second state using a switch control circuit; and
detecting a switching period of the first switch when the power converter is operating in an equilibrium condition using a ripple reduction circuit:
determining a property of a steady state load current from the switching period using the ripple reduction circuit, the steady state load current is a current that the power converter provides to a load that is coupled to the output voltage when the power converter is operating in the equilibrium condition; and
setting a first state duration based on a property of the steady state load current determined from the switching period using the ripple reduction circuit.--